(12) United States Patent
Masunaga et al.

(10) Patent No.: US 12,111,483 B2
(45) Date of Patent: Oct. 8, 2024

(54) DISPLAY, TRANSFER FOIL, ADHESIVE LABEL, AND ARTICLE HAVING DISPLAY

(71) Applicant: TOPPAN PRINTING CO., LTD., Tokyo (JP)

(72) Inventors: Yuko Masunaga, Tokyo (JP); Akira Nagano, Tokyo (JP); Yasumasa Kamata, Tokyo (JP); Hideaki Honma, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 1105 days.

(21) Appl. No.: 16/939,869

(22) Filed: Jul. 27, 2020

(65) Prior Publication Data

US 2020/0355935 A1 Nov. 12, 2020

Related U.S. Application Data

(63) Continuation of application No. PCT/JP2019/001013, filed on Jan. 16, 2019.

(30) Foreign Application Priority Data

Mar. 1, 2018 (JP) ................. 2018-036534

(51) Int. Cl.
*G02B 26/08* (2006.01)
*G02B 30/34* (2020.01)
(Continued)

(52) U.S. Cl.
CPC ............ *G02B 30/36* (2020.01); *G02B 30/34* (2020.01); *G03H 1/0244* (2013.01);
(Continued)

(58) Field of Classification Search
CPC ...... G02B 30/36; G02B 30/34; G02B 5/1842; G02B 27/4205; G02B 30/26; G02B 5/18;
(Continued)

(56) References Cited

U.S. PATENT DOCUMENTS

| 5,032,003 A | 7/1991 | Antes |
| 2006/0181077 A1* | 8/2006 | Kaule ................. G03H 1/0256 428/174 |

(Continued)

FOREIGN PATENT DOCUMENTS

| JP | H06-82612 A | 3/1994 |
| JP | H06-281804 A | 10/1994 |

(Continued)

OTHER PUBLICATIONS

International Searching Authority, "International Search Report," issued in connection with International Patent Application No. PCT/JP2019/001013, dated Apr. 23, 2019.

(Continued)

*Primary Examiner* — Euncha P Cherry
(74) *Attorney, Agent, or Firm* — Foley & Lardner LLP

(57) ABSTRACT

A display including a plurality of pixels each including a plurality of first subpixels and a plurality of second subpixels. In pixel, when illumination light is applied to the first subpixels from a normal direction, no diffracted light emerges from the plurality of first subpixels, or first diffracted light emerges from the plurality of first subpixels in a first angular range. When illumination light is applied to the second subpixels from the normal direction, no diffracted light emerges from the plurality of second subpixels, or second diffracted light having a wavelength equal to that of the first diffracted light emerges from the plurality of second subpixels in a second angular range wider than the first angular range, at an intensity lower than that of the first diffracted light; with the pixels configured to display a continuously changing image using the first diffracted light and the second diffracted light.

15 Claims, 21 Drawing Sheets

(51) Int. Cl.
*G02B 30/36* (2020.01)
*G03H 1/02* (2006.01)
*G03H 1/22* (2006.01)
*G03H 1/26* (2006.01)
*G03H 1/30* (2006.01)
*G09F 9/302* (2006.01)

(52) U.S. Cl.
CPC ........... *G03H 1/2202* (2013.01); *G03H 1/265* (2013.01); *G03H 1/30* (2013.01); *G09F 9/302* (2013.01); *G03H 2001/2242* (2013.01)

(58) Field of Classification Search
CPC ...... G02B 5/32; G03H 1/0244; G03H 1/2202; G03H 1/265; G03H 1/30; G03H 2001/2242; G03H 1/0011; G03H 2001/2273; G03H 2001/266; G03H 2001/303; G03H 2001/0216; G09F 9/302; G09F 19/14
See application file for complete search history.

(56) References Cited

U.S. PATENT DOCUMENTS

2016/0167421 A1 6/2016 Holmes
2018/0194156 A1 7/2018 Kubo et al.

FOREIGN PATENT DOCUMENTS

| JP | H07-104211 A | 4/1995 |
| JP | 2001-116908 A | 4/2001 |
| JP | 2002-311383 A | 10/2002 |
| JP | 2013-078891 A | 5/2013 |
| JP | 2016-537675 A | 12/2016 |
| JP | 2017-122836 A | 7/2017 |
| JP | 2017-207593 A | 11/2017 |
| WO | WO-2013/132024 A2 | 9/2013 |
| WO | WO-2017/073611 A | 5/2017 |

OTHER PUBLICATIONS

International Searching Authority, "Written Opinion," issued in connection with International Patent Application No. PCT/JP2019/001013, dated Apr. 23, 2019.
European Extended Search Report from EP 19760293.1 dated May 19, 2021(10 pages).
Office Action issued in corresponding Japanese Patent Application No. 2020-502846, dated Dec. 6, 2022.
Office Action issued in corresponding Korean Patent Application No. 10-2020-7026745 dated Nov. 18, 2023 (46 pages).

* cited by examiner

13b'

12b

DISPLAY, TRANSFER FOIL, ADHESIVE LABEL, AND ARTICLE HAVING DISPLAY

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2019/001013, filed on Jan. 16, 2019, which is based upon and claims the benefit of priority to Japanese Patent Application No. 2018-036534, filed on Mar. 1, 2018. The disclosures of which are all incorporated herein by reference in their entireties.

BACKGROUND

Technical Field

The present invention relates to a display, a transfer foil, an adhesive label, and an article having a display.

Background Art

Relief holograms that are difficult to counterfeit or replicate have been used for proving articles, such as commercial products, as being genuine products.

Relief holograms include a plurality of relief diffraction gratings. The colors or angles of diffracted light emerging from relief holograms can be appropriately determined according to the pitch or length directions of the troughs. Accordingly, appropriately designed relief holograms can display an image whose shape and/or position change with changes of illumination or observation direction, e.g., can display a continuously changing image such as an animated image or stereoscopic image (three-dimensional image) (JP H6-281804 A and JP H7-A).

SUMMARY OF THE INVENTION

Relief holograms, which are designed to display a continuously changing image in a narrow angular observation range, can display a clear image across this angular range. However, the inventors of the present invention have found that the observers may have a feeling of unease observing an image displayed by relief holograms that are designed to display a continuously changing image in a wide angular observation range, in particular, relief holograms that are designed to greatly change shape and/or position of an image with changes of illumination or observation direction.

The present invention aims to display a continuously changing image in a wide angular range without causing a feeling of unease to observers.

According to a first aspect of the present invention, there is provided a display including a plurality of pixels each including a plurality of first subpixels and a plurality of second subpixels. In the display, in each of the plurality of pixels, when illumination light is applied to the plurality of first subpixels from a normal direction, no diffracted light emerges from the plurality of first subpixels, or first diffracted light emerges from the plurality of first subpixels in a first angular range, and when the illumination light is applied to the plurality of second subpixels from the normal direction, no diffracted light emerges from the plurality of second subpixels, or second diffracted light having a wavelength equal to that of the first diffracted light emerges from the plurality of second subpixels in a second angular range wider than the first angular range, at an intensity lower than that of the first diffracted light; and the plurality of pixels are configured to display a continuously changing image using the first diffracted light and the second diffracted light.

The "continuously changing image" refers to an image in which position and/or shape continuously changes when the angle of the display is continuously changed relative to the illumination direction and the observation direction, with these directions being maintained constant. The "continuously changing image" may also be referred to generally as an "animation". The display presenting the "continuously changing image" is designed to sequentially display images which are slightly different in position and/or shape when the angle of the display is continuously changed relative to the illumination direction and the observation direction.

The "continuously changing image" refers to an image in which an initially displayed image fades out and an image slightly different in position and/or shape from the initial image fades in, when the observation direction is slightly changed with the illumination direction being maintained constant, and changes of these images are visually recognized as a continuous change. The "continuously changing image" includes an animated image, stereoscopic image and the like.

In the above display, one or more subpixels included in each pixel are used as a part of an image (pixel elements) to be perceived by the observer, when the angle of the display relative to the illumination direction and the observation direction is a specific angle. This display is designed to display an image with a group of subpixels distributed over a plurality of pixels and display another image with another group of subpixels distributed over the plurality of pixels.

It should be noted that if pixels are designed such that the same image is perceived by both the right and left eyes, a planar image (or an animated image) is displayed. Furthermore, if pixels are designed such that the right- and left-eye images corresponding to images obtained by observing the same object at different angles or positions are respectively perceived by the right and left eyes, a stereoscopic image utilizing binocular parallax is displayed.

The above display can display a continuously changing image in a wide angular range without causing a feeling of unease to the observer. Also, the above display can display a clear continuously changing image. In other words, the above display can display an image having high visibility and definition. This mechanism will be described below.

Indoors, usually, the light source used for illuminating a display is neither a point light source nor a light source emitting parallel rays. In other words, indoors, usually, light is incident on a display from various directions. Therefore, if the display is observed from a specific direction, an image that should be perceived when the display is observed from this direction (termed a normal image hereinafter) may be partially overlapped with one or more images that should be perceived when the display is observed from other directions (termed ghost images hereinafter).

However, actually, light of the same intensity does not necessarily enter the display from all directions. Usually, the light entering from a specific direction has a maximum intensity. As the deviation from the specific direction increases, the intensity of the incident light is reduced accordingly.

There is a difference in diffraction angle between the diffracted light for the incident light having a maximum intensity and the diffracted light for the incident light having an incident angle slightly different from the former incident light. This difference increases as the diffraction angles increase. Specifically, under the conditions of observing an image displayed by diffracted light at small diffraction angles, the difference in shape and position is small between a normal image and a ghost image derived from incident light having slightly different incident angles. However, under the conditions of observing an image displayed by diffracted light at large diffraction angles, the difference in shape and position is large between a normal image and a ghost image derived from incident light having slightly different incident angles.

Therefore, the influence of the above overlap on the image clarity is so small that the influence cannot be perceived under the conditions of observing an image displayed by the diffracted light at small diffraction angles. However, under the conditions of observing an image displayed by the diffracted light at large diffraction angles, the image may appear to be blurred due to the overlap. Such an image may cause a feeling of unease to the observer.

This issue can be solved, for example, by reducing changes in shape and position of an image with changes of illumination or observation direction. However, in this case, the continuously changing image that can be displayed may be significantly limited.

Alternatively, this issue can be solved by reducing the angular range of the observation direction in which the changes in shape and position of an image can be perceived. However, in this case, the observation direction, if it is only slightly changed, may be out of the above range. In other words, only a slight change in observation direction may prevent the observer from perceiving the changes in shape and position of an image. Therefore, a display using such a structure may cause a feeling of unease to the observer.

In this regard, the display according to the first aspect includes pixels, for example, each configured by a combination of first subpixels and second subpixels. The first subpixels are narrow-angle pixels from which diffracted light emerges in an angular observation range narrower than that of the second subpixels, and the second subpixels are wide-angle pixels from which diffracted light emerges in an angular observation range wider than that of the first subpixels. The plurality of pixels are configured to display a continuously changing image using first diffracted light and second diffracted light. In other words, an array of the first subpixels and an array of the second subpixels can display a single continuously changing image.

In the display according to the first aspect, the first subpixels from which the first diffracted light emerges in a first angular range of narrower angle, and the second subpixels from which the second diffracted light emerges in a second angular range of wider angle are designed such that the first diffracted light will have an intensity (brightness) higher than that of the second diffracted light. Accordingly, if the observation direction is in the first angular range, the observer can observe a clear first image displayed by the first diffracted light emerging from the first subpixels.

The second diffracted light displays a second image paler than the first image displayed by the first diffracted light. Accordingly, for example, if the observation direction is changed from the first angular range to the second angular range, the brightness of the image lowers.

If the displayed image becomes paler, the brightness of the ghost image becomes lower accordingly. Therefore, the clarity of the image is less likely to be affected by the ghost image. Furthermore, if the displayed image becomes paler, the blur due to the overlap of the normal and ghost images is unlikely to be perceived accordingly. Thus, this display can display a clear continuously changing image if the observation direction is in the first angular range, and can display a continuously changing image in a wide angular range without causing a feeling of unease to the observer. In other words, this display can present a continuously changing image having high visibility and definition. Such a continuously changing image may provide a good aesthetic impression to the observer.

According to a second aspect of the present invention, there is provided the display according to the first aspect. In the display, the plurality of first subpixels included in each of the plurality of pixels include two or more first subpixels in which emergence angles of the first diffracted light are different from each other; the plurality of second subpixels included in each of the plurality of pixels include two or more second subpixels in which emergence angles of the second diffracted light are different from each other; and a minimum value of difference between emergence angles of the first diffracted light emerging from the two or more first subpixels is smaller than a minimum value of difference between emergence angles of the second diffracted light emerging from the two or more second subpixels.

If the minimum value of difference between emergence angles of the first diffracted light is reduced, the first image may be more smoothly changed according to the observation direction. If the minimum value of difference between emergence angles of the second diffracted light is increased, smooth change of the second image according to the observation direction may be deteriorated. However, the second image displayed by the second diffracted light is paler than the first image displayed by the first diffracted light. Accordingly, even if smoothness in changes of the second images according to the observation direction is low, the observer is unlikely to feel uneasy due to the low smoothness.

Thus, according to this display, the ratio of the total area of the second subpixels to the area of each pixel can be reduced, and accordingly, the ratio of the total area of the first subpixels to the area of each pixel can be increased. Thus, according to this display, for example, the first image can be more smoothly changed without causing a feeling of unease to the observer.

According to a third aspect of the present invention, there is provided the display according to the first aspect. In the display, the plurality of pixels each further include a plurality of third subpixels. In each of the plurality of pixels, when the illumination light is applied to the plurality of third subpixels from the normal direction, no diffracted light emerges from the plurality of third subpixels, or third diffracted light having a wavelength equal to that of the first diffracted light emerges from the plurality of third subpixels in a third angular range adjacent to the second angular range with the first angular range sandwiched therebetween, at an intensity lower than that of the first diffracted light; and the plurality of pixels are configured to display a continuously changing image using the first diffracted light, the second diffracted light and the third diffracted light.

This display can display a continuously changing image in a wide angular range without causing a feeling of unease to the observer if, for example, the observation direction is changed in the horizontal direction or in the vertical direction.

According to a fourth aspect of the present invention, there is provided the display according to the third aspect. In the display, the plurality of first subpixels included in each of the plurality of pixels include two or more first subpixels in which emergence angles of the first diffracted light are different from each other; the plurality of second subpixels included in each of the plurality of pixels include two or more second subpixels in which emergence angles of the second diffracted light are different from each other; the plurality of third subpixels included in each of the plurality of pixels include two or more third subpixels in which emergence angles of the third diffracted light are different from each other; and a minimum value of difference between emergence angles of the first diffracted light emerging from the two or more first subpixels is smaller than a minimum value of difference between emergence angles of the second diffracted light emerging from the two or more second subpixels and a minimum value of difference between emergence angles of the third diffracted light emerging from the two or more third subpixels.

According to this display, the first image can be more smoothly changed without causing a feeling of unease to the observer if, for example, the observation direction is changed in the horizontal direction or the vertical direction.

According to a fifth aspect of the present invention, there is provided a display including a plurality of pixels each including a plurality of first subpixels and a plurality of second subpixels. In each of the plurality of pixels of the display, when illumination light is applied to the plurality of first subpixels from a normal direction, no diffracted light emerges from the plurality of first subpixels, or first diffracted light emerges from the plurality of first subpixels in a first angular range, and when the illumination light is applied to the plurality of second subpixels from the normal direction, no diffracted light emerges from the plurality of second subpixels, or second diffracted light having a wavelength equal to that of the first diffracted light emerges from the plurality of second subpixels in a second angular range wider than the first angular range. Furthermore, in the display, the plurality of pixels are configured to display a continuously changing image using the first diffracted light and the second diffracted light; the plurality of first subpixels included in each of the plurality of pixels include two or more first subpixels in which emergence angles of the first diffracted light are different from each other; the plurality of second subpixels included in each of the plurality of pixels include two or more second subpixels in which emergence angles of the second diffracted light are different from each other; and a minimum value of difference between emergence angles of the first diffracted light emerging from the two or more first subpixels is smaller than a minimum value of difference between emergence angles of the second diffracted light emerging from the two or more second subpixels.

If the minimum value of difference between emergence angles of the first diffracted light is reduced, the first image may be smoothly changed according to the observation direction. If the minimum value of difference between emergence angles of the second diffracted light is increased, smooth change of the second image according to the observation direction may be deteriorated. However, if the minimum value of difference between emergence angles of the first diffracted light is reduced, brightness may be increased accordingly in the continuously changing image expressed by a plurality of first images which are sequentially displayed as the observation direction or the like is changed. Contrarily, if the minimum value of difference between emergence angles of the second diffracted light is increased, paleness may be increased accordingly in the continuously changing image expressed by a plurality of second images which are sequentially displayed as the observation direction or the like is changed.

Accordingly, even if smoothness is low in the changes of the second images according to the observation direction, the observer is unlikely to feel uneasy due to the low smoothness. Furthermore, when observing the second image, the ghost images, which have lower brightness, are less likely to affect the image clarity. If the image becomes paler, the blur due to the overlap of the normal and ghost images is unlikely to be perceived accordingly.

Thus, according to this display, the ratio of the total area of the second subpixels to the area of each pixel can be reduced, and accordingly, the ratio of the total area of the first subpixels to the area of each pixel can be increased. Thus, according to this display, for example, the first image can be smoothly changed without causing a feeling of unease to the observer. In other words, this display can display a continuously changing image in a wide angular range without causing a feeling of unease to the observer. Thus, according to an example, the image presented by the display gives a sophisticated impression to the observer.

According to a sixth aspect of the present invention, there is provided the display according to the fifth aspect. In the display, the plurality of pixels each further include a plurality of third subpixels. In each of the plurality of pixels of the display, when the illumination light is applied to the plurality of third subpixels from the normal direction, no diffracted light emerges from the plurality of third subpixels, or third diffracted light having a wavelength equal to that of the first diffracted light emerges from the plurality of third subpixels in a third angular range adjacent to the second angular range with the first angular range sandwiched therebetween. Furthermore, in the display, the plurality of pixels are configured to display a continuously changing image using the first diffracted light, the second diffracted light and the third diffracted light; the plurality of third subpixels included in each of the plurality of pixels include two or more third subpixels in which emergence angles of the third diffracted light are different from each other; and a minimum value of difference between emergence angles of the first diffracted light emerging from the two or more first subpixels is smaller than a minimum value of difference between emergence angles of the third diffracted light emerging from the two or more third subpixels.

This display can display a continuously changing image in a wide angular range without causing a feeling of unease to the observer if, for example, the observation direction is changed in the horizontal direction or in the vertical direction.

According to a seventh aspect of the present invention, there is provided a display including a plurality of pixels each including a plurality of first subpixels and a plurality of second subpixels. In each of the plurality of pixels of the display, the plurality of first subpixels include no diffraction grating, or include a first diffraction grating formed of crests or troughs which are arrayed in a width direction and have length directions in a first range, and the plurality of second subpixels include no diffraction grating, or include a second diffraction grating formed of crests or troughs which are arrayed in a width direction and have length directions in a second range different from the first range, each of the plurality of second subpixels having an area smaller than that of each of the first subpixels. Furthermore, in the display, the plurality of pixels are configured to display a continuously changing image with diffracted light emerging from the first and second diffraction gratings.

This display can also display a continuously changing image in a wide angular range without causing a feeling of unease to the observer similarly to the display of the first aspect. In other words, this display can present a continuously changing image having high visibility and definition.

Such a continuously changing image may provide a good aesthetic impression to the observer.

According to an eighth aspect of the present invention, there is provided the display according to the seventh aspect. In the display, the plurality of pixels each further include a plurality of third subpixels. In each of the plurality of pixels of the display, the plurality of third subpixels include no diffraction grating, or include a third diffraction grating formed of crests or troughs which are arrayed in a width direction and have length directions in a third range different from the first and second ranges, each of the plurality of third subpixels having an area smaller than that of each of the first subpixels. Furthermore, in the display, the plurality of pixels are configured to display a continuously changing image with diffracted light emerging from the first, second and third diffraction gratings.

This display can display a continuously changing image in a wide angular range without causing a feeling of unease to the observer if, for example, the observation direction is changed in the horizontal direction or in the vertical direction.

According to a ninth aspect of the present invention, there is provided a display including a plurality of pixels each including a plurality of first subpixels and a plurality of second subpixels. In each of the plurality of pixels of the display, the plurality of first subpixels include no diffraction grating, or include a first diffraction grating formed of crests or troughs which are arrayed in a width direction and have length directions in a first range, and the plurality of second subpixels include no diffraction grating, or include a second diffraction grating formed of crests or troughs which are arrayed in a width direction and have length directions in a second range different from the first range. Furthermore, in the display, the plurality of pixels are configured to display a continuously changing image with diffracted light emerging from the first and second diffraction gratings; the plurality of first subpixels included in each of the plurality of pixels include two or more first subpixels in which the crests or troughs of the first diffraction grating have length directions different from each other; the plurality of second subpixels included in each of the plurality of pixels include two or more second subpixels in which the crests or troughs of the second diffraction grating have length directions different from each other; and a minimum value of difference between length directions of the crests or troughs among the first diffraction gratings is smaller than a minimum value of difference between length directions of the crests or troughs among the second diffraction gratings.

This display can also display a continuously changing image in a wide angular range without causing a feeling of unease to the observer similarly to the display of the fifth aspect. In other words, this display can present a continuously changing image having high visibility and definition. Such a continuously changing image may provide a good aesthetic impression to the observer.

According to a tenth aspect of the present invention, there is provided the display according to the ninth aspect. In the display, the plurality of pixels each further include a plurality of third subpixels. In each of the plurality of pixels of the display, the plurality of third subpixels include no diffraction grating, or include a third diffraction grating formed of crests or troughs which are arrayed in a width direction and have length directions in a third range different from the first and second ranges. Furthermore, in the display, the plurality of pixels are configured to display a continuously changing image with diffracted light emerging from the first, second and third diffraction gratings; the plurality of third subpixels included in each of the plurality of pixels include two or more third pixels in which the crests or troughs of the third diffraction grating have length directions different from each other; and a minimum value of difference between length directions of the crests or troughs among the first diffraction gratings is smaller than a minimum value of difference between length directions of the crests or troughs among the third diffraction gratings.

This display can display a continuously changing image in a wide angular range without causing a feeling of unease to the observer if, for example, the observation direction is changed in the horizontal direction or in the vertical direction.

The minimum value of difference between length directions of the crests or troughs among the second diffraction gratings is preferred to have a difference in the range of 0.1° to 2.0°, and more preferably in the range of 0.2° to 1.5°, from the minimum value of difference between length directions of the crests or troughs among the first diffraction gratings. Also, the minimum value of difference between length directions of the crests or troughs among the third diffraction gratings is preferred to have a difference in the range of 0.1° to 2.0°, and more preferably in the range of 0.2° to 1.5°, from the minimum value of difference between length directions of the crests or troughs among the first diffraction gratings.

According to an eleventh aspect of the present invention, there is provided the display according to any one of the first, second, fifth and ninth aspects. In the display, a first area S1 of each of the plurality of first subpixels is larger than a second area S2 of each of the plurality of second subpixels.

For example, when the first area S1 is made larger than the second area S2, the intensity of the second diffracted light can be reduced relative to that of the first diffracted light. Alternatively, when the diffraction efficiency of the first subpixels is made higher than that of the second subpixels, the intensity of the second diffracted light can be reduced relative to that of the first diffracted light. If the former configuration is used, the display can be easily designed and produced.

According to a twelfth aspect of the present invention, there is provided the display according to the eleventh aspect. In the display, a ratio of the first area S1 to the second area S2 expressed by S1/S2 is 1.2 or more. The ratio S1/S2 is preferred to be in the range of 1.2 to 5, and more preferably in the range of 1.4 to 3.5.

If this ratio is increased, the intensity of the second diffracted light can be reduced relative to that of the first diffracted light. However, if this ratio is excessively increased, the intensity of the second diffracted light may be excessively reduced.

According to a thirteenth aspect of the present invention, there is provided the display according to any of the third, fourth, sixth and tenth aspects. In the display, a first area S1 of each of the plurality of first subpixels is larger than a second area S2 of each of the plurality of second subpixels and a third area S3 of each of the plurality of third subpixels.

For example, when the first area S1 is made larger than the second area S2 and the third area S3, the intensity of the second diffracted light and the third diffracted light can be reduced relative to that of the first diffracted light. Alternatively, when the diffraction efficiency of the first subpixels is made higher than that of the second subpixels or the third subpixels, the intensity of the second diffracted light or the third diffracted light can be reduced relative to that of the first diffracted light. If the former configuration is used, the display can be relatively easily designed and produced.

According to a fourteenth aspect of the present invention, there is provided the display according to the thirteenth aspect. In the display, a ratio of the first area S1 to the second area S2 expressed by S1/S2, and a ratio of the first area S1 to the third area S3 expressed by S1/S3 are each 1.2 or more. The ratio S1/S2 and the ratio S1/S3 are each preferred to be in the range of 1.2 to 5, and more preferably in the range of 1.4 to 3.5.

If these ratios are increased, the intensity of the second diffracted light or the third diffracted light can be reduced relative to that of the first diffracted light. However, if these ratios are excessively increased, the intensity of the second diffracted light or the third diffracted light may be excessively reduced.

According to a fifteenth aspect of the present invention, there is provided the display according to any of the first to fourteenth aspects, which is configured to display a full color image as the continuously changing image. The "full color image" herein refers to an image from which three or more colors that are different in chromaticity can be perceived when observed with the naked eye. A "monochrome image" refers to an image from which colors are perceived to have constant chromaticity across the image when observed with the naked eye. The full color image and the monochrome image may each be a halftone image.

The above displays may use a configuration for displaying a monochrome image or a configuration for displaying a full color image. To display a full color image, for example, a combination of red-, green- and blue-color subpixels may be arranged for each observation direction in each pixel. The blue-color subpixels can diffract light having a wavelength in the range of 400 nm or more and less than 490 nm according to an example, or in the range of 435 nm or more and 480 nm or less according to another example. The diffracted light can display an image. The green-color subpixels can diffract light having a wavelength in the range of 490 nm or more and 580 nm or less according to an example, or in the range of 500 nm or more and 560 nm or less according to another example. The diffracted light can display an image. The red-color subpixels can diffract light having a wavelength in the range of 595 nm or more and 800 nm or less according to an example, or in the range of 610 nm or more and 750 nm or less according to another example. The diffracted light can display an image.

According to another aspect of the present invention, there is provided the display according to any of the above aspects. In the display, the first subpixels and the second subpixels, or the first subpixels, the second subpixels and the third subpixels correspond to a diffraction grating formed of a plurality of crests or troughs arrayed in a width direction. Alternatively, according to another aspect of the present invention, there is provided the display according to any of the above aspects. In the display, the first subpixels and the second subpixels, or the first subpixels, the second subpixels and the third subpixels correspond to a cross grating formed of a plurality of first crests or troughs arrayed in a width direction and a plurality of second crests or troughs arrayed in the width direction and intersecting the first crests or troughs.

According to still another aspect of the present invention, the crests or troughs of the first subpixels have length directions in the angular range of $-\alpha_1$ to $+\alpha_1$, the crests or troughs of the second subpixels have length directions in the angular range of $-\alpha_2$ to $-\alpha_1$ or $+\alpha_1$ to $+\alpha_2$, and the crests or troughs of the third subpixels have length directions in the angular range of $+\alpha_1$ to $+\alpha_2$ or $-\alpha_2$ to $-\alpha_1$ ($0°<\alpha_1<\alpha_2<90°$). $\alpha_1$ is preferred to be in the range of 10° to 20°. $\alpha_2$ is preferred to be in the range of 15° to 30°. The difference between $\alpha_2$ and $\alpha_1$ is preferred to be in the range of 3° to 12°.

According to still another aspect of the present invention, a minimum value of difference between length directions of the crests or troughs among the first subpixels emitting the first diffracted light is 1° or less. Also, a minimum value of difference between length directions of the crests or troughs among the second subpixels emitting the second diffracted light is 1° or less. Furthermore, a minimum value of difference between length directions of the crests or troughs among the third subpixels emitting the third diffracted light is 1° or less. The minimum value may locally slightly exceed 1° as long as the average is 1° or less. However, it is preferred that the minimum value does not exceed 1.5° even locally.

According to a sixteenth aspect of the present invention, there is provided a display including a plurality of pixels each including a wide-range display region and a narrow-range display region. In each of the plurality of pixels of the display, the wide-range display region includes no diffraction grating, or includes a wide-range display diffraction grating formed of first crests or troughs curved in an arc shape and arrayed in a width direction (Y direction in FIGS. 20 to 24), the narrow-range display region includes no diffraction grating, or includes a narrow-range display diffraction grating formed of second crests or troughs curved in an arc shape and arrayed in a width direction, and the arc formed by the first crests or troughs is a first arc or a part thereof having a first center angle, and the arc formed by the second crests or troughs is a second arc or a part thereof having a second center angle smaller than the first center angle. Furthermore, in the display, the plurality of pixels are configured to display a continuously changing image with diffracted light emerging from the wide-range display diffraction grating and diffracted light emerging from the narrow-range display diffraction grating.

The first arc is a smallest arc including one or more curved lines obtained by translating and overlapping the first crests or troughs included in the plurality of pixels. Also, the second arc may be, for example, a smallest arc including one or more curved lines obtained by translating and overlapping the second crests or troughs included in the plurality of pixels.

If there is a pixel in which the wide- and narrow-range display diffraction gratings are designed to emit diffracted light with maximum brightness across the angular range, the pixel may contain first crests or troughs or second crests or troughs arrayed in a direction perpendicular to the width direction (lateral direction) and extending from first to second ends of the pixel. In such a pixel, the first crests or troughs and the second crests or troughs extending from the first to second ends respectively correspond to the first arc and the second arc.

Accordingly, for example, in the structure shown in FIG. 23, the first center angle may be the center angle of an arc formed by crests or troughs having a maximum dimension in the X direction among the crests or troughs included in the diffraction grating DG1. Also, in the structure shown in FIG. 23, the second center angle may be the center angle of an arc formed by crests or troughs having a maximum dimension in the X direction among the crests or troughs included in the diffraction grating DG2.

First crests or troughs extending from the first to second ends are not necessarily present in a pixel. If such a pixel includes two first crests or troughs separated from each other on the same circle, one extending from first to second ends and the other extending from second to first ends, the shortest arc including these two first crests or troughs corresponds to the first arc. In other words, one arc obtained by interpolating the two arcs corresponding to these two first crests or troughs is the first arc.

Similarly, second crests or troughs extending from the first to second ends are not necessarily present in a pixel. If such a pixel includes two second crests or troughs separated from each other on the same circle, one extending from first to second ends and the other extending from second to first ends, the shortest arc including these two second crests or troughs corresponds to the second arc. In other words, one arc obtained by interpolating the two arcs corresponding to these two second crests or troughs is the second arc.

In this display, in a partial observation range of the entire observation range, i.e., in the above first angular range, the diffracted light emerging from the wide-range display diffraction grating and the diffracted light emerging from the narrow-range display diffraction grating contribute to displaying an image. In the remaining range of the entire observation range, i.e., in the above second and/or third angular ranges, only the diffracted light emerging from the wide-range display diffraction grating contributes to displaying an image. Therefore, this display can also display a continuously changing image in a wide angular range without causing a feeling of unease to the observer similarly to the display of the first, fifth, seventh or ninth aspect. In other words, this display can present a continuously changing image having high visibility and definition. Such a continuously changing image may provide a good aesthetic impression to the observer. This display can display, for example, a continuously changing image such as of a sculpture image.

According to a seventeenth aspect of the present invention, there is provided the display according to the sixteenth aspect in which the curvature of the second arc is smaller than that of the first arc.

Using this configuration, for example, substantially equal dimension is ensured in a direction perpendicular to the width direction, between the wide- and narrow-range display diffraction gratings. In this case, for example, when the wide- and narrow-range display diffraction gratings are arrayed in the width direction, the ratio of the total area of these diffraction gratings to the area of the pixel can be increased. In other words, in this case, the wide- and narrow-range display diffraction gratings are easy to lay out.

According to an eighteenth aspect of the present invention, there is provided a display including a plurality of pixels each including a wide-range display region and a narrow-range display region. In each of the plurality of pixels of the display, the wide-range display region includes no diffraction grating, or includes a wide-range display diffraction grating formed of first crests or troughs curved in an arc shape and arrayed in a width direction, the narrow-range display region includes no diffraction grating, or includes a narrow-range display diffraction grating formed of second crests or troughs curved in an arc shape and arrayed in a width direction, the wide-range display region and the narrow-range display region have an equal dimension in a direction perpendicular to the width direction, and a curvature of the arc formed by the second crests or troughs is smaller than a curvature of the arc formed by the first crests or troughs. Furthermore, in the display, the plurality of pixels are configured to display a continuously changing image with diffracted light emerging from the wide-range display diffraction grating and diffracted light emerging from the narrow-range display diffraction grating.

This display can also display a continuously changing image in a wide angular range without causing a feeling of unease to the observer similarly to the display of the seventeenth aspect. In other words, this display can present a continuously changing image having high visibility and definition. Such a continuously changing image may provide a good aesthetic impression to the observer. This display can display, for example, a continuously changing image such as of a sculpture image.

In this display, the wide- and narrow-range display regions ensure an equal dimension in a direction perpendicular to the width direction. Therefore, for example, when the wide- and narrow-range display diffraction gratings are arrayed in the width direction, the ratio of the total area of these diffraction gratings to the area of the pixel can be increased. In other words, the wide- and narrow-range display diffraction gratings are easy to lay out.

According to a nineteenth aspect of the present invention, there is provided the display according to any of the sixteenth to eighteenth aspects. In the display, the wide-range display region and the narrow-range display region each include a plurality of subpixels arrayed in a direction perpendicular to the width direction.

In this configuration, in each of the wide- and narrow-range display regions, the plurality of subpixels contribute to displaying a plurality of images observed from different directions. The ratio of the area of a region occupied by a diffraction grating in each subpixel corresponds to the brightness of the pixel including the subpixel in an image for which the subpixel contributes to display.

This display can also display a continuously changing image in a wide angular range without causing a feeling of unease to the observer. This display can display an image of rich gradation using subpixels.

According to a twentieth aspect of the present invention, there is provided the display according to any of the sixteenth to nineteenth aspects, which is configured to display a full color image as the continuously changing image.

The above displays may use a configuration for displaying a monochrome image or a configuration for displaying a full color image. To display a full color image, for example, a combination of red-, green- and blue-color subpixels may be arranged for each observation direction in each pixel.

According to another aspect of the present invention, an angle of a line segment connecting between one end of a first arc and the center of the circle is $-\gamma_1$ relative to the width direction, an angle of a line segment connecting between the other end of the second arc and the center of the circle is $+\gamma_1$ relative to the width direction, an angle of a line segment connecting between one end of a second arc and the center of the circle is $-\gamma_2$ relative to the width direction, and an angle of a line segment connecting between the other end of the first arc and the center of the circle is $+\gamma_2$ relative to the width direction ($0° < \gamma_2 < \gamma_1$). In this case, a first center angle is $2\gamma_1$, while a second center angle is $2\gamma_2$.

According to still another aspect of the present invention, the minimum value of difference between length directions of the crests or troughs among the subpixels contained in the wide-range display regions has a difference in the range of 0.1° to 2.0°, and more preferably in the range of 0.2° to 1.5°, from the minimum value of difference between length directions of the crests or troughs among the subpixels contained in the narrow-range display regions.

According to still another aspect of the present invention, the ratio of the area of the wide-range display region to the area of the narrow-range display region is in the range of 0.5 to 2.0. If this area ratio is reduced, contribution of the narrow-range display region to image display is reduced. If this area ratio is increased, contribution of the wide-range display region to image display is reduced.

According to still another aspect of the present invention, there is provided the display according to the above aspect, in which the adjacent crests of troughs have a pitch in the range of 500 nm to 2,000 nm.

According to still another aspect of the present invention, there is provided the display according to any of the above aspects, in which each of the plurality of pixels have longitudinal and lateral dimensions each of which is in the range of 10 μm to 200 μm, and more preferably in the range of 50 μm to 100 μm. The "longitudinal direction" herein refers to the vertical direction in an image presented by the display. Also, the "lateral direction" refers to the horizontal direction in an image presented by the display.

According to still another aspect of the present invention, there is provided the display according to any of the above aspects, in which each of the subpixels has a longitudinal dimension in the range of 0.5 μm to 50 μm, a lateral dimension in the range of 50 μm to 0.5 μm, and an area in the range of 10 μm$^2$ to 100 μm$^2$.

To display an image in color, the subpixels can be further divided into subpixels (subpixels R) displaying red at a specific angle, subpixels (subpixels G) displaying green at the specific angle, and subpixels (subpixels B) displaying blue at the specific angle. The subpixels R, G and B have the same dimensional ranges as those of the subpixels described above.

According to still another aspect of the present invention, there is provided the display according to any of the above aspects. In the display, each of the plurality of pixels includes first to third sub-regions as the wide-range display region, and fourth to sixth sub-regions as the narrow-range display region, the first and fourth sub-regions displaying a first color, the second and fifth sub-regions displaying a second color different from the first color, the third and sixth sub-regions displaying a third color different from the first and second colors.

According to still another aspect of the present invention, there is provided the display according to the above aspect. In each of the plurality of pixels of the display, the first to sixth sub-regions each have a shape extended in a first direction intersecting an array direction of the first crests or troughs and an array direction of the second crests or troughs; the first to third sub-regions are arrayed in a second direction intersecting the first direction; the fourth to sixth sub-regions are arrayed in the second direction; a column formed by the first to third sub-regions and a column formed by the fourth to sixth sub-regions are arrayed in the second direction; two of the second, third, fifth and sixth sub-regions are interposed between the first and fourth sub-regions; two of the first, third, fourth and sixth sub-regions are interposed between the second and fifth sub-regions; and two of the first, second, fourth and fifth sub-regions are interposed between the third and sixth sub-regions.

The display using this structure can display a facial image such as of a person or an animal (e.g., lion or zebra) with high definition and as a diffraction image with reasonable clarity. In other words, the display using the above structure can display a diffraction image that appears to be natural to the observer. The display using this structure can suitably display an image of a person or animal, or an image of a mammal in particular.

According to still another aspect of the present invention, there is provided the display according to the above aspect. In each of the plurality of pixels of the display, the first to sixth sub-regions each have a shape extended in a first direction intersecting an array direction of the first crests or troughs and an array direction of the second crests or troughs; the first and fourth sub-regions are arrayed in a second direction intersecting the first direction; the second and fifth sub-regions are arrayed in the second direction; the third and sixth sub-regions are arrayed in the second direction; and a column formed by the first and fourth sub-regions, a column formed by the second and fifth sub-regions, and a column formed by the third and sixth sub-regions are arrayed in the second direction.

The display using this structure can present images of monochromatic or colorful objects, such as buildings, flowers or animals (e.g., birds or tropical fish), as a diffraction image. The display using this structure can suitably display images of buildings, flowers, birds, tropical fish or insects.

According to still another aspect of the present invention, there is provided the display according to the above aspect. In each of the plurality of pixels of the display, the first to sixth sub-regions each have a shape extended in a first direction intersecting an array direction of the first crests or troughs and an array direction of the second crests or troughs; the first to third sub-regions are arrayed in a second direction intersecting the first direction; the fourth to sixth sub-regions are arrayed in the second direction; a column formed by the first to third sub-regions and a column formed by the fourth to sixth sub-regions are arrayed in the first direction; the first and fourth sub-regions are adjacent to each other in the first direction; the second and fifth sub-regions are adjacent to each other in the first direction; and the third and sixth sub-regions are adjacent to each other in the first direction.

The display using this structure is suitable for presenting an image with a small apparent depth as a diffraction image. The display using this structure can suitably present an image of three-dimensional characters, a cameo or coin.

According to still another aspect of the present invention, there is provided the display according to any of the above aspects, in which each of the first to sixth sub-regions has a dimensional ratio of the first direction to the second direction which is in the range of 1 to 5.

According to still another aspect of the present invention, there is provided the display according to any of the above aspects. In each of the plurality of pixels of the display, adjacently located first to sixth sub-regions have a distance of 300 μm or less therebetween.

According to still another aspect of the present invention, there is provided the display according to any of the above aspects. In each of the plurality of pixels of the display, adjacently located first to sixth sub-regions have a distance of 50 μm or less therebetween.

According to still another aspect of the present invention, there is provided the display according to any of the above aspects, including a relief structure forming layer having a relief structure on a surface thereof, and a reflective layer covering the surface. In the display, the relief structure is provided with a diffraction grating emitting the first diffracted light and the second diffracted light, or emitting the first diffracted light, the second diffracted light and the third diffracted light at an interface between the relief structure forming layer and the reflective layer, or on a surface of the reflective layer.

According to still another aspect of the present invention, there is provided the display according to any of the above aspects, including a relief structure forming layer having a relief structure on a surface thereof, and a reflective layer covering the surface. In the display, the relief structure is provided with the diffraction grating at an interface between the relief structure forming layer and the reflective layer, or on a surface of the reflective layer.

Examples of the materials used for the relief structure forming layer include thermoplastic resins, thermosetting resins and ultraviolet- or radiation-curable resins. As the thermoplastic resins, acrylic resins, epoxy resins, cellulose resins or vinyl resins may be used. As the thermosetting resins, urethane resins in which polyisocyanate as a cross-linking agent is added, for crosslinkage, to acrylic polyol or polyester polyol having a reactive hydroxyl group, melamine resins or phenol resins may be used. As the ultraviolet- or radiation-curable resins, acrylic resins may be used. Examples of the acrylic resins include epoxy acrylate, epoxy methacrylate, urethane acrylate and urethane methacrylate.

The relief structure forming layer can be formed through the following process. For example, a plate provided with a relief structure may be pressed against a thermoplastic resin layer with application of heat, and then the plate may be removed (released) from the thermoplastic resin layer. Alternatively, a coating film of an ultraviolet-curable resin may be formed on a support or a carrier. Then, a plate may be pressed against the coating film with application of ultraviolet rays to cure the ultraviolet-curable resin, and then the plate may be removed (released) from the coating film. Alternatively, a coating film of a thermosetting resin may be formed. Then, a plate may be pressed against the coating film with application of heat to cure the thermosetting resin, and then the plate may be removed (released) from the coating film. The relief structure forming layer may have a thickness, for example, in the range of 1 μm or more and 25 μm or less.

As materials for the reflective layer, metal may be used. As the reflective layer, a metal layer of aluminum, silver, gold or an alloy thereof may be used. Alternatively, the reflective layer may be a dielectric layer having a refractive index different from that of the relief structure forming layer. Alternatively, the reflective layer may be a laminate of dielectric layers, i.e., a dielectric multilayer film, in which the refractive index is different between adjacent dielectric layers. Of the dielectric layers included in the dielectric multilayer film, the layer contacting the relief structure forming layer may desirably have a refractive index different from that of the relief structure forming layer. The reflective layer may be formed using a physical deposition method and/or a chemical deposition method. The physical deposition method may be a physical vapor deposition method, such as vacuum vapor deposition, sputtering or the like. Inorganic or organic compounds may be used for the dielectric layer or dielectric multilayer film. Alternatively, as the reflective layer, a multilayer film including a dielectric layer of an inorganic or organic compound and a metal layer may be used.

Examples of the inorganic compound include oxides, sulfides, fluorides and nitrides. Examples of the oxides include metal oxides and silicon oxides (SiO). As the fluorides, metal fluorides may be used. As the nitrides, for example, metal nitrides may be used. As the sulfides, for example, metal sulfides may be used. Examples of the metal oxides include titanium oxide (TiO), zinc oxide (ZnO) and alumina. Examples of the sulfides include zinc sulfide (ZnS) and aluminum sulfide (AlS). Examples of the nitrides include calcium nitride (CaN) and magnesium nitride (MgN). As the metal fluorides, magnesium fluoride (MgF) or calcium fluoride (CaF) may be used.

The reflective layer covers a part or all of a relief structure surface that is a major surface on which a relief structure is formed among the two major surfaces of the relief structure forming layer. When the reflective layer covers a part of the relief structure surface, a pattern according to the contour of the reflective layer can be presented. The pattern presented by the contour of the reflective layer may be associated with the pattern presented by the relief structure. The pattern presented by the contour of the reflective layer may be a pattern framing the relief structure.

The reflective layer may be a layer passing no visible light therethrough. Alternatively, the reflective layer may be a visible light transmissive layer, e.g., a transparent layer, such as a transparent vapor deposition layer. The "visible light transmissive layer" herein refers to a layer having an optical density (OD) of 1.5 or less for light with a wavelength of 550 nm. The "optical density (OD)" is calculated from the following equation, where the intensity of the incident light having the above wavelength is I0, and the intensity of the transmitted light having the above wavelength is I1.

$$OD=\log_{10}(I_0/I_1)$$

When the reflective layer is a visible light transmissive layer, a part of illumination light is reflected by the reflective layer and another part of illumination light is transmitted through the reflective layer. A part of light transmitted through the reflective layer is reflected by an article located behind the display and is again transmitted through the reflective layer. In other words, the light reflected by the article behind the display can also contribute to image display.

Therefore, for example, when an article having a display described later includes a print pattern at the position of the display, an image obtained by overlapping the image presented by the display with the image presented by the print pattern can be displayed. It is difficult to counterfeit an article having a display presenting such an image, or to reproduce such an image in a replicated article. An "article having a display" may also be referred to as an "article having a label".

The surface of the reflective layer opposite to the relief structure surface side surface may be provided with a reflection protective layer. The reflection protective layer may be formed as a layer having openings at portions. Using this reflection protective layer as an etching mask, portions of the reflective layer not covered with the reflection protective layer may be selectively etched away to obtain a reflective layer partially covering the relief structure surface.

The reflection protective layer may be made, for example, of an inorganic compound, a polymer or a combination thereof. As the inorganic compound, for example, an oxide or nitride may be used. Examples of the oxide include silicon oxide (SiO) and alumina, and examples of the nitride include calcium nitride (CaN), titanium nitride (TiN) and aluminum nitride (AlN). The polymer may be, for example, a urethane resin or acrylic resin.

The reflective layer may have a thickness in the range, for example, of 10 nm or more and 500 nm or less.

According to still another aspect of the present invention, there is provided a transfer foil which is provided with a transfer layer including the display according to any of the above aspects, and a support or a carrier separably supporting the transfer layer.

According to an example, the transfer layer includes a transfer portion and a non-transfer portion, which are adjacent to each other. In the transfer layer, the transfer portion is a portion transferred to an article and includes the above display. In the transfer layer, the non-transfer portion is a portion remaining without being transferred to the article. The non-transfer portion has a layer configuration similar to that of the transfer portion.

The support or carrier may be, for example, a resin (plastic) film or a resin (plastic) sheet. As the support or carrier, a thermoplastic may be used. As the thermoplastic, a material having good heat resistance, such as polyethylene terephthalate (PET), may be used. The major surface of the support or carrier supporting the transfer layer may be provided with a release layer containing, for example, a fluororesin or a silicone resin. The support or carrier may have a thickness in the range of 4 µm or more and 50 µm or less.

According to still another aspect of the present invention, there is provided the transfer foil according to the above aspect, in which the transfer layer further includes a separation protective layer interposed between the display and the support.

The separation protective layer enhances separation of the transfer portion from the support or carrier, while protecting the surface of the separated transfer portion, i.e., the display, from damage or deterioration. For example, the separation protective layer may have optical transparency. For example, the separation protective layer may be made of a resin. The resin forming the separation protective layer may be, for example, an ultraviolet cured resin, thermoset resin or thermoplastic resin. For example, the resin may be an acrylic resin. The separation protective layer may have a thickness in the range of 0.5 µm or more and 5 µm or less. The separation protective layer may contain a powder. The powder may be any of silica powder, silicone powder, fluororesin powder, polyester powder, acrylic powder and ETFE resin powder, or a blend of two or more of these powders. The "ETFE" is an abbreviated name of an ethylene/tetrafluoroethylene copolymer.

According to still another aspect of the present invention, there is provided a transfer foil further including an adhesive layer covering the transfer layer.

The adhesive layer may be made, for example, of a thermoplastic resin. As the thermoplastic resin, a polyethylene resin, polyester resin, acrylic resin or olefin resin may be used. The adhesive layer may have a thickness in the range, for example, of 0.5 µm or more and 20 µm or less.

According to still another aspect of the present invention, there is provided an adhesive label including the display according to any of the above aspects and an adhesive layer provided to one major surface of the display.

The adhesive layer is made of an adhesive, such as a pressure sensitive adhesive. The adhesive that can be used may be a vinyl chloride-vinyl acetate copolymer or polyester polyamide, or an acrylic adhesive, or an adhesive of butyl rubber or natural rubber, a silicone adhesive or polyisobutyl adhesive.

The adhesive may contain one or more additives. Examples of the additives include aggregating components, such as alkyl methacrylate, vinyl ester, acrylonitrile, styrene and vinyl monomer; reforming components, such as unsaturated carboxylic acid, hydroxy group-containing monomers and acrylonitrile; polymerization initiators; plasticizers; curing agents; curing accelerators; antioxidants; and a mixture containing two or more of these materials.

According to still another aspect of the present invention, there is provided an article having a display including the display according to any of the above aspects, and an article supporting the display.

The article may support the display by any method. For example, the display may be bonded to the surface of the article or may be embedded in the article. Specifically, the article having a display may be obtained by transferring the display to the surface of an article from a transfer foil including the display, or may be obtained by bonding a label including the display to an article. Also, the article having a display may be obtained by transferring the display to the surface of an article body from a transfer foil including the display and providing an article surface layer to cover the display, or may be obtained by bonding a label including the display to the surface of an article body and providing an article surface layer to cover the label.

According to still another aspect of the present invention, there is provided the article having a display according to the above aspect. In the article having a display, the article has an elongated shape, the display has a center which is distanced from a plane passing through a center of the article and perpendicular to a length direction of the article, and a line segment extending from the center of the display and equally dividing an angular range of diffracted light emerging from the first subpixels is tilted with respect to the plane.

According to still another aspect of the present invention, there is provided the article having a display according to the above aspect. In the article having a display, the article has an elongated shape, the display has a center which is distanced from a plane passing through a center of the article and perpendicular to a length direction of the article, and a line segment extending from the center of the display and equally dividing an angular range of diffracted light emerging from the wide-range display diffraction grating is tilted with respect to the plane.

When an article has an elongated shape, such an article is usually designed so that an image is correctly displayed when the article is observed with the longitudinal direction thereof being made parallel to the line connecting between the observer's eyes. When the above article is designed in this way, the observer may usually observe the article having a display so that the center of the article is positioned on a plane passing through the intermediate point between the observer's eyes and perpendicular to the line connecting between the observer's eyes. Therefore, when the center of the display is distanced from the above plane and the above line segment is tilted as mentioned above, the observer may perceive a brightest image that the display can display, for example, under the normal observation conditions of observing an article. Accordingly, the article having a display using the above configuration easily enables easy observation of the image presented by the display.

According to still another aspect of the present invention, there is provided the article having a display according to the above aspect. The article includes a print pattern, the print pattern presents characters, the display has a center which is distanced from a plane passing through a center of the article and perpendicular to a width direction of the characters, and a line segment extending from the center of the display and equally dividing an angular range of diffracted light emerging from the first subpixels is tilted with respect to the plane.

According to still another aspect of the present invention, there is provided the article having a display according to the above aspect. The article includes a print pattern, the print pattern presents characters, the display has a center which is distanced from a plane passing through a center of the article and perpendicular to a width direction of the characters, and a line segment extending from the center of the display and equally dividing an angular range of diffracted light emerging from the first subpixels is tilted with respect to the plane.

When an article includes a print pattern and the print pattern presents characters, the observer may usually observe the article having a display so that the width direction of the characters is parallel to the line connecting between the observer's eyes. Thus, the observer may usually observe the article having a display so that the center of the article is positioned on a plane passing through an intermediate point between the observer's eyes and perpendicular to the line connecting between the observer's eyes. Therefore, when the center of the display is distanced from the above plane and the above line segment is tilted as mentioned above, the observer may perceive a brightest image that the display can display, for example, under the normal observation conditions of observing an article. Accordingly, the article having a display using the above configuration easily enables easy observation of the image presented by the display.

According to still another aspect of the present invention, there is provided the article having a display according to the above aspect, in which the article is made of plastic, metal, paper or a composite of these materials.

According to still another aspect of the present invention, there is provided the article having a display according to any of the above aspects, in which the article contains paper, the display is incorporated in the paper, and the paper is open at the position of the display.

According to still another aspect of the present invention, there is provided the article having a display according to any of the above aspects, which serves as bank notes, securities, verifications, credit cards, personal authentication media, such as passports or IDs (identifications), or packages with contents packed therein.

DETAILED DESCRIPTION

Figure 1:
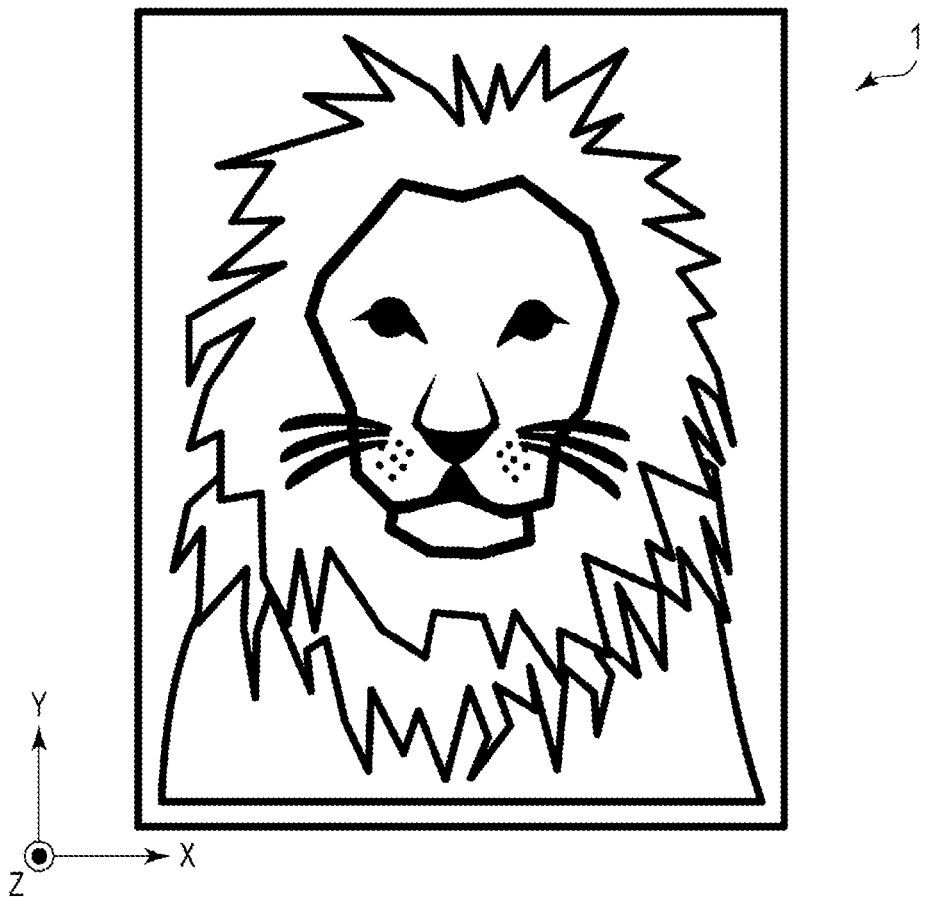
FIG. 1 is a schematic plan view illustrating a display according to a first embodiment of the present invention.

With reference to the drawings, embodiments of the present invention will be described below. The present embodiments explain the gist of the invention and should not limit the interpretation of the following embodiments. It should be understood that the embodiments are merely representative of the present invention. Those skilled in the art can appropriately change the design of the representative embodiments described below.

The drawings are provided for illustrative purposes only, and the dimensions, e.g., the thickness of the layers and the thickness ratios thereof, are not necessarily to scale. Furthermore, the dimensional ratios should not be construed as being limited to those shown in the drawings. Unless otherwise specified for convenience reasons, like components in the embodiments are denoted by like reference signs to omit duplicate description. The embodiments of the present disclosure are a group of embodiments based on a single unique invention from the background. The aspects of the present disclosure are those of the group of embodiments based on a single invention. The configurations described in the present disclosure can include the aspects of the present disclosure. The features of the present disclosure may be combined with each other to achieve the configurations. Therefore, the features, configurations, aspects and embodiments of the present disclosure may be combined with each other, and the combinations can have synergistic functions and exert synergistic effects.

First, a first embodiment of the present invention will be described. The first embodiment is a specific version of any of the aspects set forth above.

Figure 2:
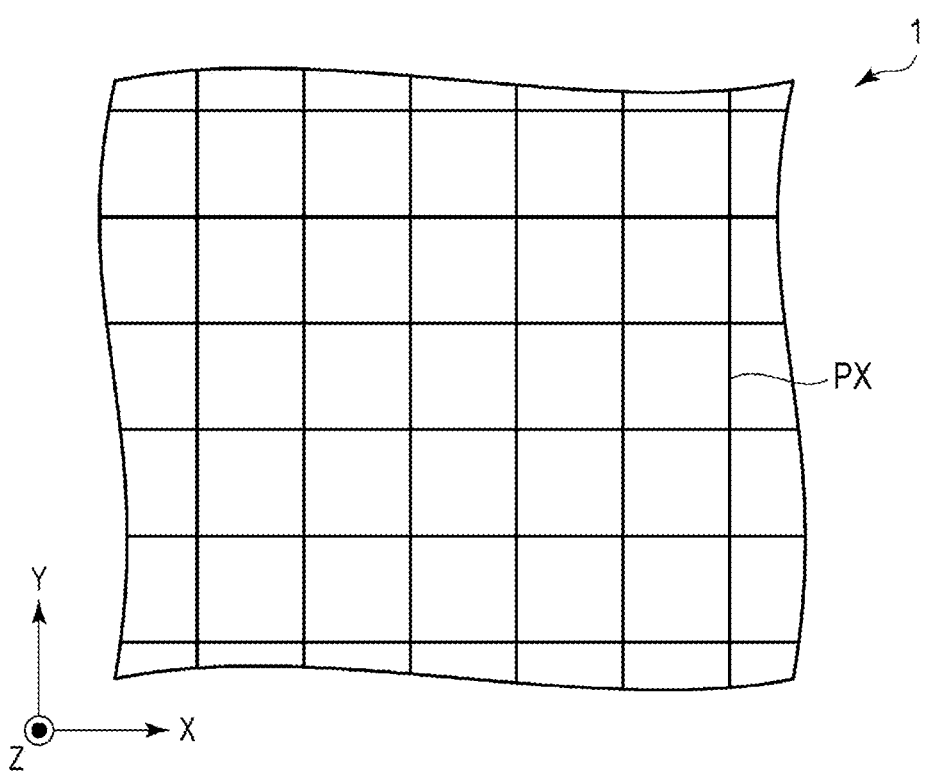
FIG. 2 is a partially enlarged plan view illustrating the display shown in FIG. 1.
Figure 3:
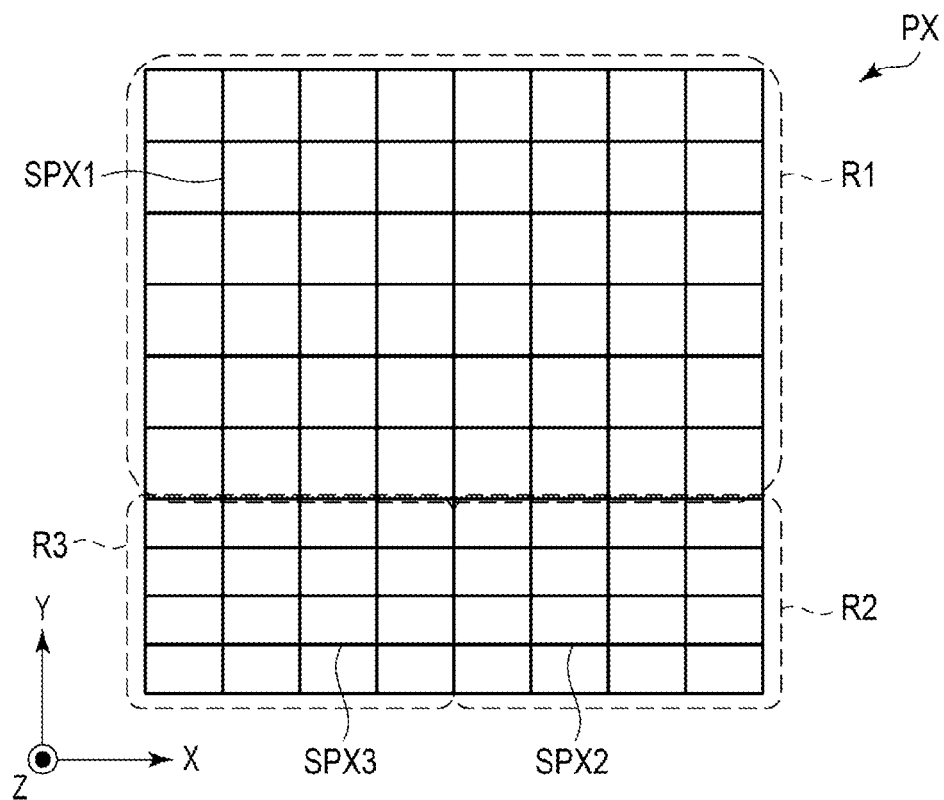
FIG. 3 is an enlarged plan view illustrating a pixel included in the display shown in FIG. 1 or 2.
Figure 4:
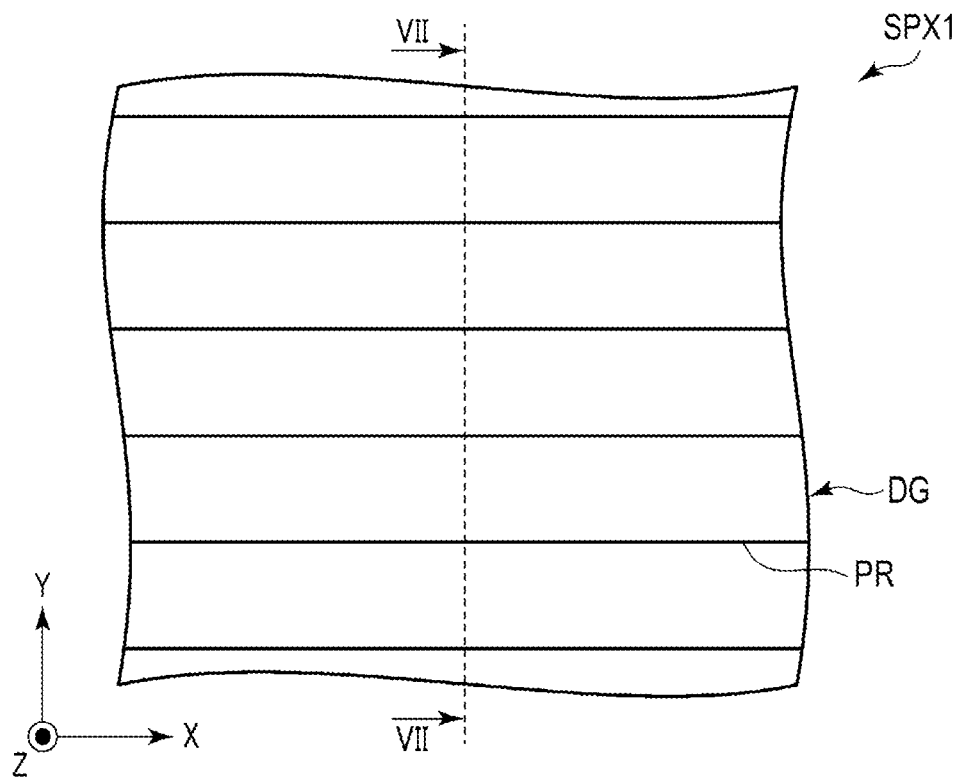
FIG. 4 is an enlarged schematic plan view illustrating an example of first subpixels included in the pixel shown in FIG. 3.
Figure 5:
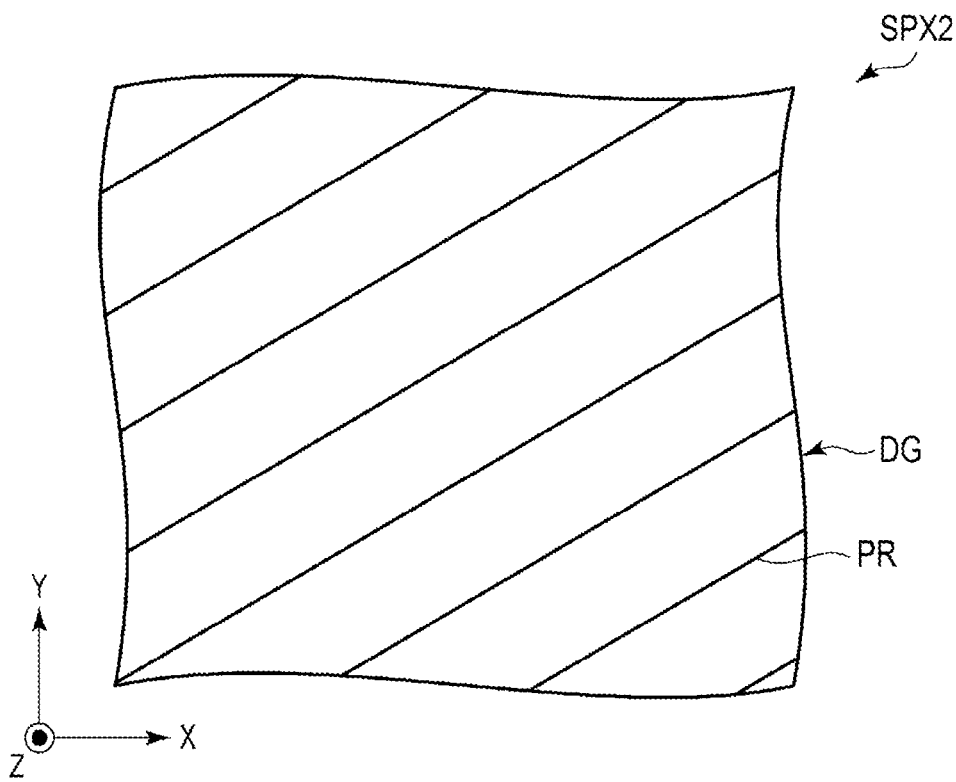
FIG. 5 is an enlarged schematic plan view illustrating an example of second subpixels included in the pixel shown in FIG. 3.
Figure 6:
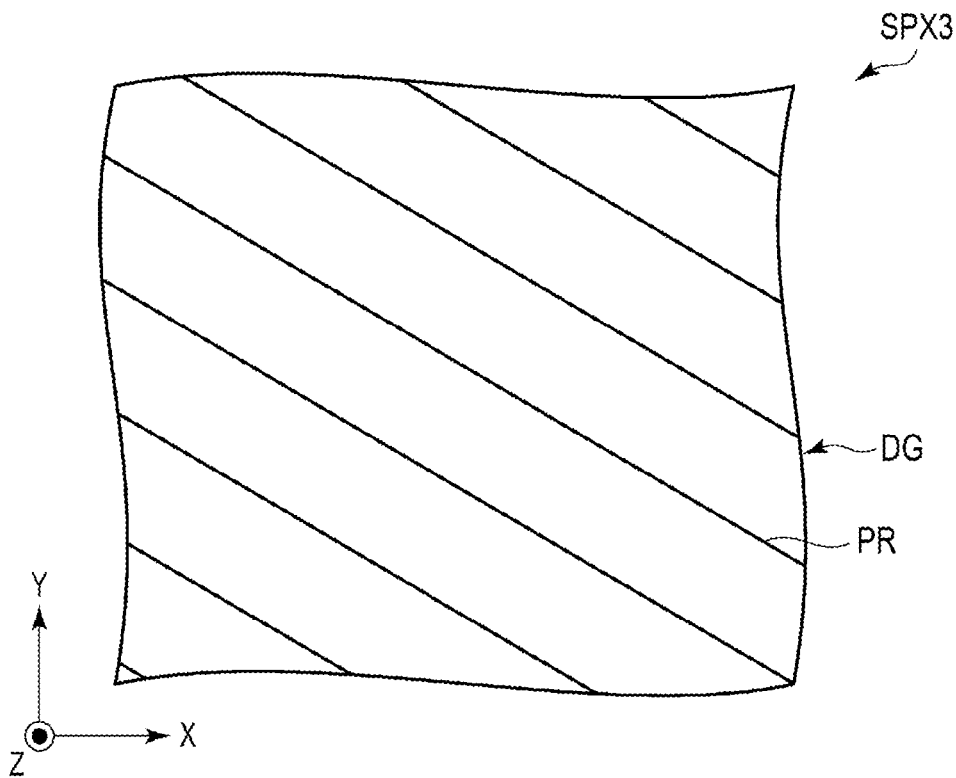
FIG. 6 is an enlarged schematic plan view illustrating an example of third subpixels included in the pixel shown in FIG. 3.
Figure 7:
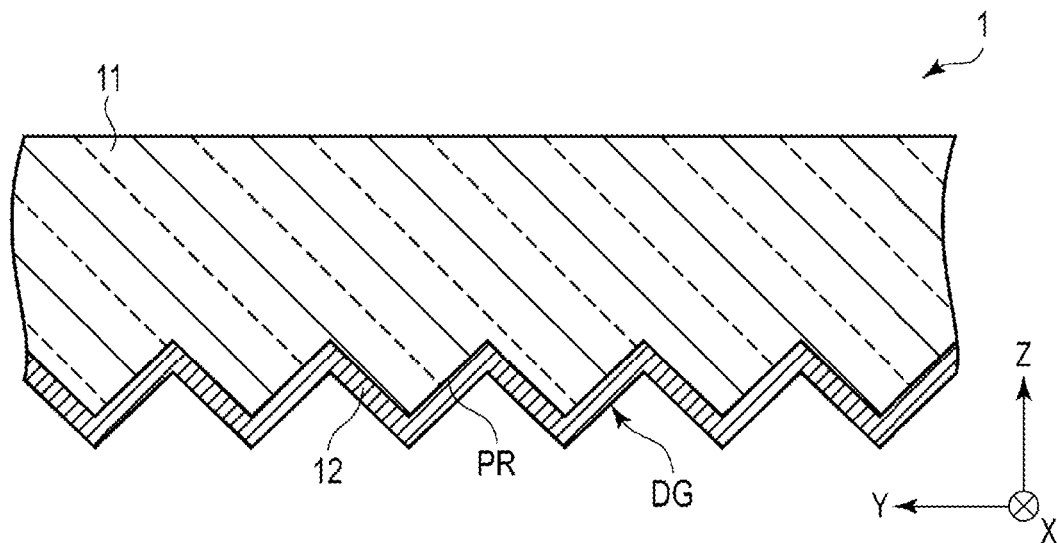
FIG. 7 is an enlarged schematic cross-sectional view illustrating the display shown in FIG. 1 or 2.

FIG. 1 is a schematic plan view illustrating a display according to the first embodiment of the present invention. FIG. 2 is a partially enlarged plan view illustrating the display shown in FIG. 1. FIG. 3 is an enlarged plan view illustrating a pixel included in the display shown in FIG. 1 or 2. FIG. 4 is an enlarged schematic plan view illustrating an example of first subpixels included in the pixel shown in FIG. 3. FIG. 5 is an enlarged schematic plan view illustrating an example of second subpixels included in the pixel shown in FIG. 3. FIG. 6 is an enlarged schematic plan view illustrating an example of third subpixels included in the pixel shown in FIG. 3. FIG. 7 is an enlarged schematic cross-sectional view illustrating the display shown in FIG. 1 or 2.

The cross section shown in FIG. 7 is taken along the line VII-VII of FIG. 4. In FIGS. 1 to 7, the X and Y directions are parallel to a major surface of a display 1 and perpendicular to each other. The X and Y directions respectively correspond to the lateral and longitudinal directions of the display 1. The Z direction is perpendicular to the X and Y directions and corresponds to the thickness direction of the display 1.

As shown in FIG. 7, the display 1 shown in FIG. 1, 2 or 7 includes a relief structure forming layer 11 and a reflective layer 12. In the display 1, the relief structure forming layer 11 side is the front facing the observer and the reflective layer 12 side is the rear. In the display 1, the reflective layer 12 side may be the front facing the observer and the relief structure forming layer 11 side may be the rear. In both cases, the reflective layer 12 is disposed to contact a relief surface of the relief structure forming layer 11.

As shown in FIG. 2, the display 1 includes a plurality of pixels PX which are arrayed in directions intersecting each other. The pixels PX herein are arrayed in the X and Y directions. Both or either of the array directions of the pixels PX may be oblique to the X or Y direction.

As shown in FIG. 3, each pixel PX includes a first region R1, a second region R2 and a third region R3. The first region R1 may have an area equal to or smaller than each of the second and third regions R2 and R3. However, it is preferred that the first region R1 has an area larger than the area of each of the second and third regions R2 and R3.

The array of the first regions R1 has recorded thereon a plurality of images to be presented by the display 1 under low-angle observation conditions. "Low-angle observation conditions" refers to conditions where the angle in the Z direction is small relative to the plane perpendicular to the line segment connecting between the observer's eyes. For example, when the Z direction is parallel to the plane perpendicular to the line segment connecting between the observer's eyes and is then gradually increased in angle relative to this plane, with the illumination direction, the observation direction and the Y direction being maintained constant, the array of the first regions R1 sequentially displays a plurality of images with a slight difference therebetween in shape and/or position.

Each first region R1 includes a plurality of first subpixels SPX1. If illumination is applied to the first subpixels SPX1 from the normal direction, no diffracted light emerges therefrom, or first diffracted light emerges therefrom in a first angular range.

One first subpixel SPX1 included in each pixel PX is used as an image element included in one of the plurality of images to be displayed by the array of the first regions R1. Another first subpixel SPX1 included in each pixel PX is used as an image element included in another one of the plurality of images to be displayed by the array of the first regions R1. Thus, the plurality of first subpixels SPX1 in each pixel PX respectively correspond to the image elements of the plurality of images to be displayed by the array of the first regions R1.

The first subpixels SPX1 emitting no diffracted light include no diffraction grating. The first subpixels SPX1 which emit first diffracted light include, for example, a diffraction grating DG shown in FIG. 4. The diffraction grating DG is a relief diffraction grating formed of a plurality of crests or troughs PR arrayed in the width direction. If one pixel PX includes two or more first subpixels SPX1 emitting the first diffracted light, these first subpixels SPX1 have the diffraction grating DG in which the length directions of the crests or troughs PR are slightly different from each other. In the diffraction grating DG of the first subpixels SPX1, the angles of the length directions of the crests or troughs PR relative to the X direction are, for example, in the range of $-\alpha_1$ to $+\alpha_1$ ($0°<\alpha_1$). It should be noted that the clockwise angle with reference to the X direction is taken to be a positive angle, while the counterclockwise angle with reference to the X direction is taken to be a negative angle.

The arrays of the second and third regions R2 and R3 each have recorded thereon a plurality of images to be presented by the display 1 under wide-angle observation conditions. The "wide-angle observation conditions" refers to the conditions where the angle of the Z direction is large relative to the plane perpendicular to the line segment connecting between the observer's eyes. For example, when the Z direction is tilted relative to the plane perpendicular to the line segment connecting between the observer's eyes and is then gradually increased in angle relative to this plane, with the illumination direction, the observation direction and the Y direction being maintained constant, the array of the second regions R2 sequentially displays a plurality of images with a slight difference therebetween in shape and/or position. For example, when the Z direction is reversely tilted relative to the plane perpendicular to the line segment connecting between the observer's eyes and is then gradually increased in angle relative to this plane, with the illumination direction, the observation direction and the Y direction being maintained constant, the array of the third regions R3 sequentially displays a plurality of images with a slight difference therebetween in shape and/or position.

The second region R2 includes a plurality of second subpixels SPX2. If illumination is applied to the second subpixels SPX2 from the normal direction, no diffracted light emerges therefrom, or second diffracted light emerges therefrom in a second angular range wider than the first angular range and at an intensity lower than that of the first diffracted light. Each second subpixel SPX2 is designed to have an area smaller than the area of each first subpixel SPX1 to reduce the intensity of the second diffracted light more than that of the first diffracted light.

One second subpixel SPX2 included in each pixel PX is used as an image element included in one of the plurality of images to be displayed by the array of the second regions R2. Another second subpixel SPX2 included in each pixel PX is used as an image element included in another one of the plurality of images to be displayed by the array of the second regions R2. Thus, the plurality of second subpixels SPX2 in each pixel PX respectively correspond to the image elements of the plurality of images to be displayed by the array of the second regions R2.

Second subpixels SPX2 emitting no diffracted light include no diffraction grating. Second subpixels SPX2 which emit second diffracted light include, for example, a diffraction grating DG shown in FIG. 5. The diffraction grating DG is a relief diffraction grating formed of a plurality of crests or troughs PR arrayed in the width direction. If one pixel PX includes two or more second subpixels SPX2 emitting second diffracted light, these second subpixels SPX2 have a diffraction grating DG in which the length directions of the crests or troughs PR are slightly different from each other. In the diffraction grating DG of the second subpixels SPX2, the angles of the length directions of the crests or troughs PR relative to the X direction are, for example, in the range of $-\alpha_2$ to $-\alpha_1$ ($\alpha_1<\alpha_2<90°$).

The third region R3 includes a plurality of third subpixels SPX3. If illumination is applied to the third subpixels SPX3 from the normal direction, no diffracted light emerges therefrom, or third diffracted light emerges therefrom in a third angular range adjacent to the second angular range with the first angular range sandwiched therebetween, and at an intensity lower than that of the first diffracted light. Each third subpixel SPX3 is designed to have an area smaller than the area of each first subpixel SPX1 to reduce the intensity of the third diffracted light more than that of the first diffracted light.

One third subpixel SPX3 included in each pixel PX is used as an image element included in one of the plurality of images to be displayed by the array of the third regions R3. Another third subpixel SPX3 included in each pixel PX is used as an image element included in another one of the plurality of images to be displayed by the array of the third regions R3. Thus, the plurality of third subpixels SPX3 in each pixel PX respectively correspond to the image elements of the plurality of images to be displayed by the array of the third regions R3.

Third subpixels SPX3 emitting no diffracted light include no diffraction grating. Third subpixels SPX3 which emit third diffracted light include, for example, a diffraction grating DG shown in FIG. 6. The diffraction grating DG is a relief diffraction grating formed of a plurality of crests or troughs PR arrayed in the width direction. If one pixel PX includes two or more third subpixels SPX3 emitting third diffracted light, these third subpixels SPX3 have the diffraction grating DG in which the length directions of the crests or troughs PR are slightly different from each other. In the diffraction grating DG of the third subpixels SPX3, the angles of the length directions of the crests or troughs PR relative to the X direction are, for example, in the range of $+\alpha_1$ to $+\alpha_2$.

The display 1 is designed to display an image with a group of subpixels distributed over a plurality of pixels PX and display another image with another group of subpixels distributed over the plurality of pixels PX. For example, when the Z direction is parallel to the plane perpendicular to the line segment connecting between the observer's eyes and is then gradually increased in angle relative to this plane, with the illumination direction, the observation direction and the Y direction being maintained constant, the display 1 sequentially switches subpixel groups contributing to image presentation in the pixels PX. As a result, a plurality of images which are slightly different therebetween in shape and/or position are sequentially displayed, and the observer perceives this as a continuously changing image.

The display 1 can display a continuously changing image in a wide angular range without causing a feeling of unease to the observer. This will be described referring to FIGS. 8 to 15.

Figure 8:
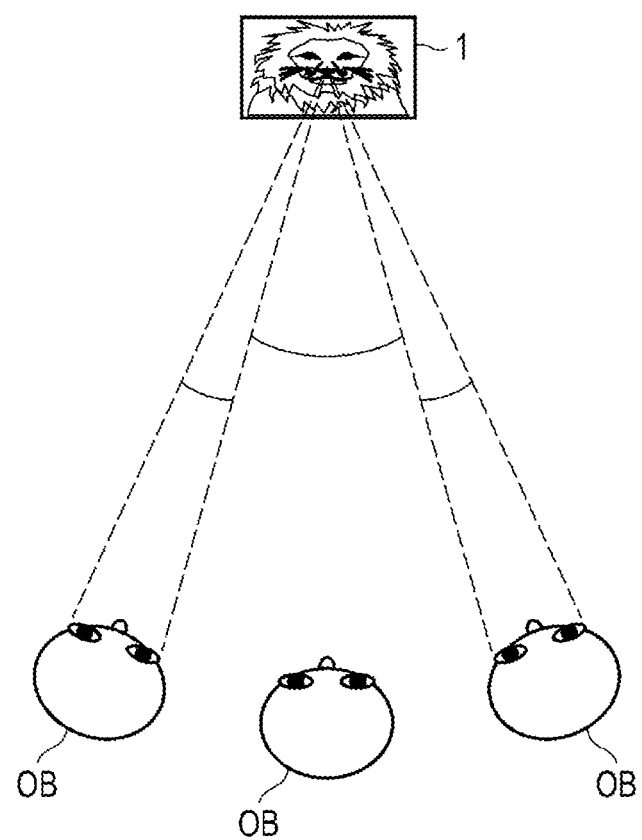
FIG. 8 is a schematic diagram illustrating a scene in which the display shown in FIG. 1 or 2 is observed by observers.
Figure 9:
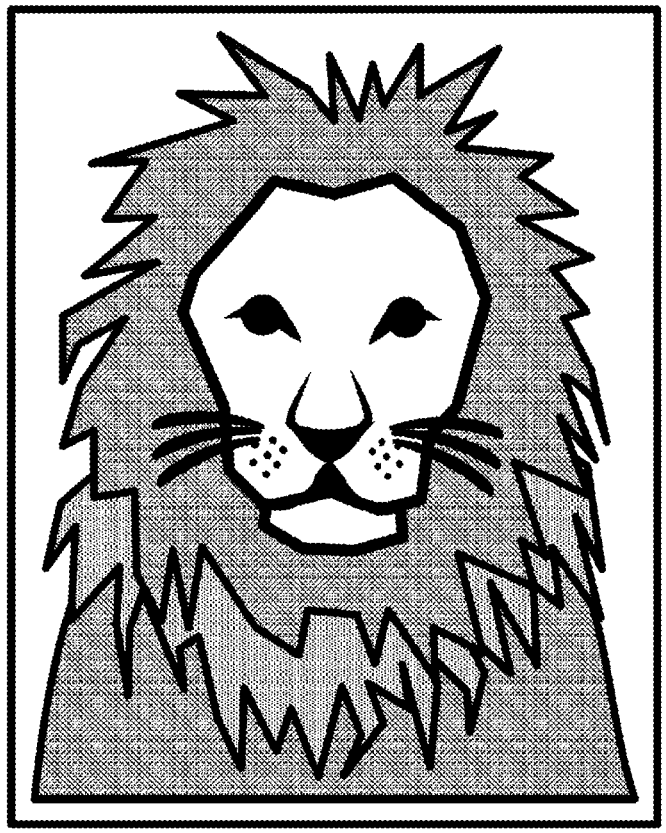
FIG. 9 is a diagram illustrating an example of an image presented by a display according to a comparative example and observed from the front.
Figure 10:
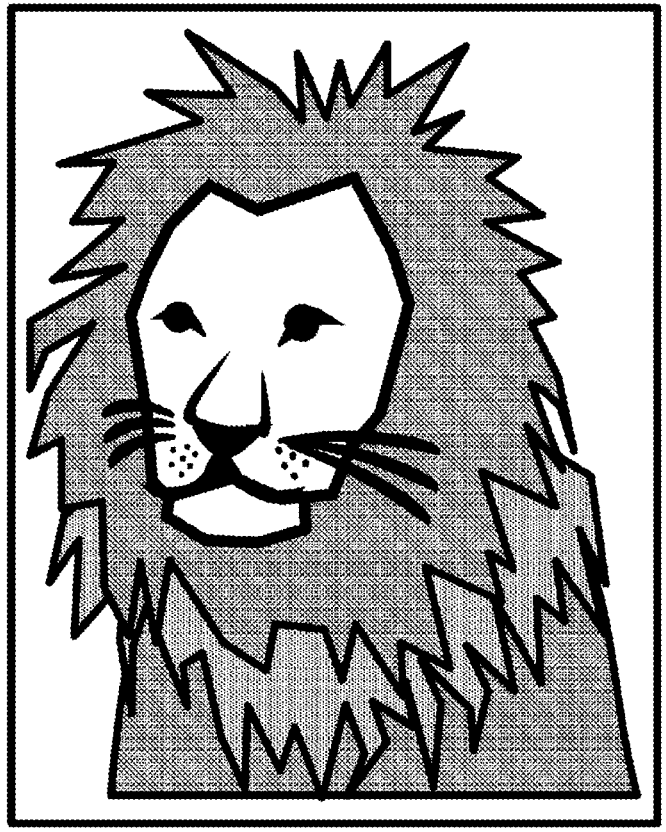
FIG. 10 is a diagram illustrating an example of an image presented by a display according to a comparative example and observed from the right diagonal direction.
Figure 11:
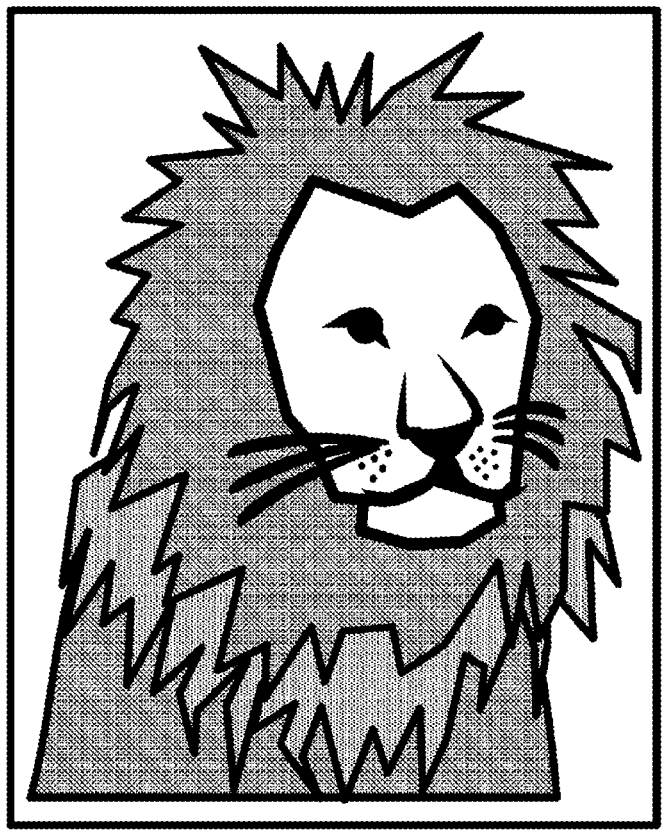
FIG. 11 is a diagram illustrating an example of an image presented by a display according to a comparative example and observed from the left diagonal direction.
Figure 12:
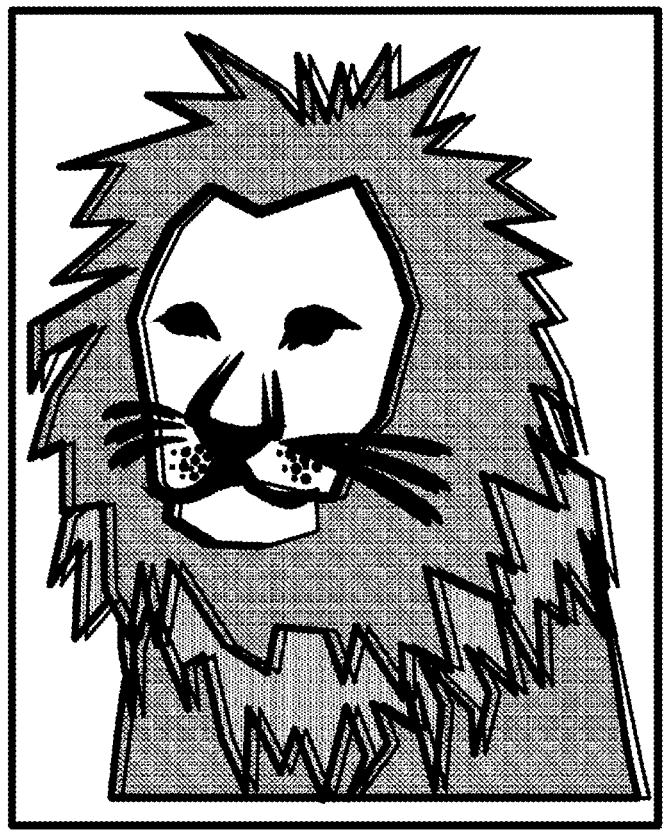
FIG. 12 is a diagram illustrating an example of an image presented by a display according to a comparative example and observed from the right diagonal direction at a wider angle.
Figure 13:
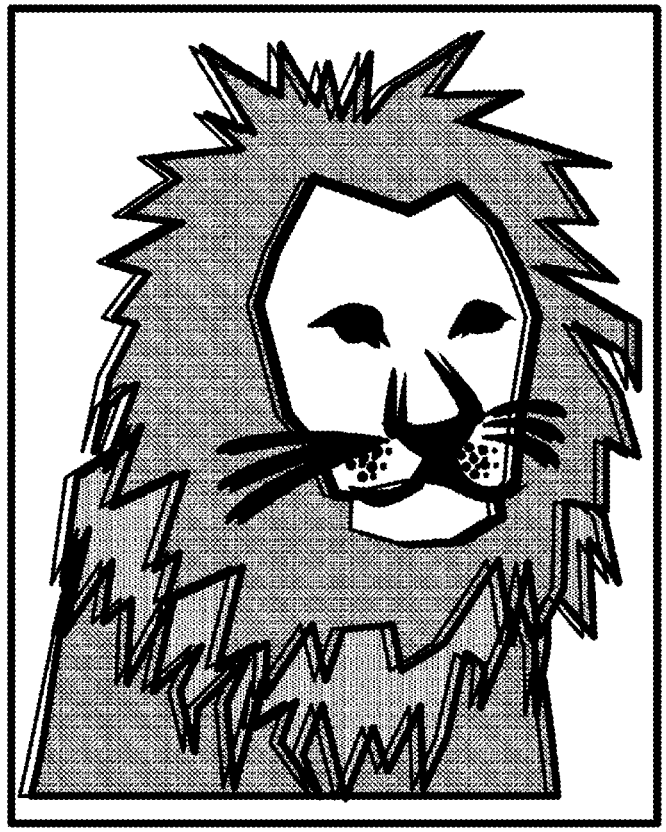
FIG. 13 is a diagram illustrating an example of an image presented by a display according to a comparative example and observed from the left diagonal direction at a wider angle.
Figure 14:
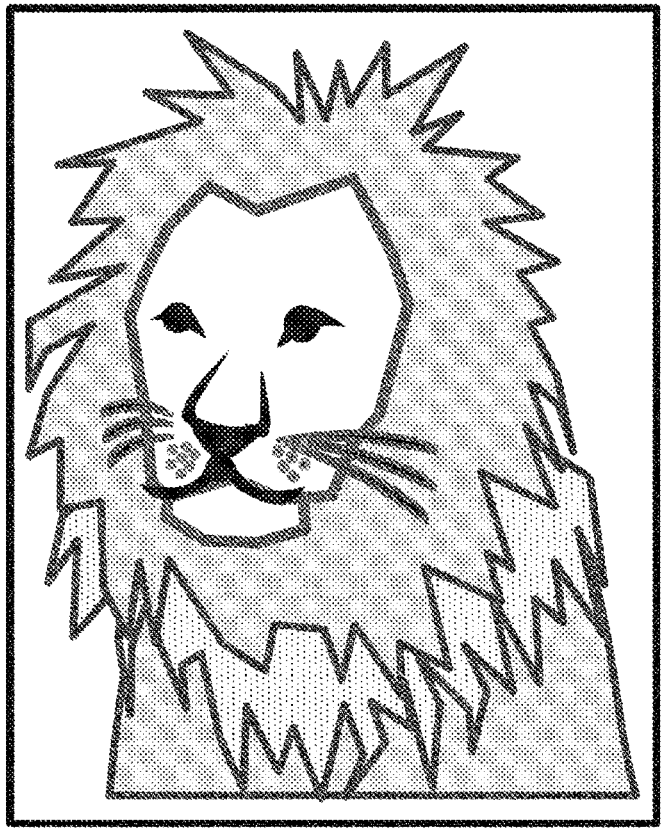
FIG. 14 is a diagram illustrating an example of an image presented by the display shown in FIG. 1 or 2 under the same conditions as in FIG. 12.
Figure 15:
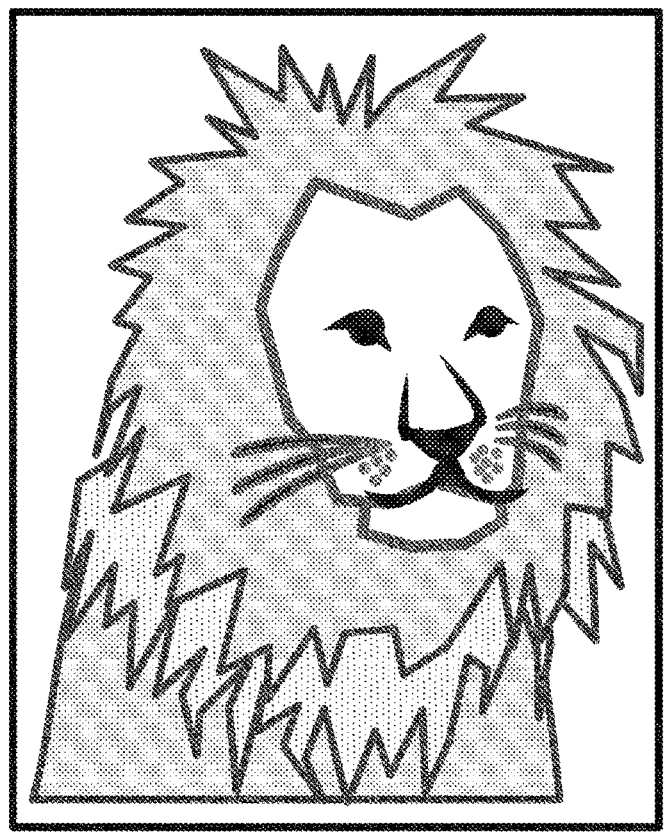
FIG. 15 is a diagram illustrating an example of an image presented by the display shown in FIG. 1 or 2 under the same conditions as in FIG. 13.

FIG. 8 is a schematic diagram illustrating a scene in which the display shown in FIG. 1 or 2 is observed by observers. FIG. 9 is a diagram illustrating an example of an image presented by a display according to a comparative example and observed from the front. FIG. 10 is a diagram illustrating an example of an image presented by a display according to a comparative example and observed from the right diagonal direction. FIG. 11 is a diagram illustrating an example of an image presented by a display according to a comparative example and observed from the left diagonal direction. FIG. 12 is a diagram illustrating an example of an image presented by a display according to a comparative example and observed from the right diagonal direction at a wider angle. FIG. 13 is a diagram illustrating an example of an image presented by a display according to a comparative example and observed from the left diagonal direction at a wider angle. FIG. 14 is a diagram illustrating an example of an image presented by the display shown in FIG. 1 or 2 under the same conditions as in FIG. 12. FIG. 15 is a diagram illustrating an example of an image presented by the display shown in FIG. 1 or 2 under the same conditions as in FIG. 13.

When observing a continuously changing image presented by the display 1, for example, the display 1 may be rotated about an axis passing through the center thereof and parallel to the longitudinal direction thereof, from a state in which the normal line to the display 1 is parallel to the plane perpendicular to the line segment connecting between the observer's eyes, with the illumination direction and the observation direction being maintained constant. Under these observation conditions, a display according to a comparative example displays an image described below. In the display according to a comparative example, subpixels emitting diffracted light among the first, second and third subpixels SPX1, SPX2 and SPX3 are all assumed to emit diffracted light with equal wavelength and intensity under the same frontal conditions.

When the normal line to the display is parallel to the plane perpendicular to the line segment connecting between the observer's eyes, or, for example, when the center observer OB in FIG. 8 observes the display 1, the display 1 can display an image I1 shown in FIG. 9.

When the normal line to the display is slightly tilted rightward relative to the plane perpendicular to the line segment connecting between the observer's eyes, the display displays, for example, an image I2a shown in FIG. 10. When the normal line to the display is slightly tilted leftward relative to the plane perpendicular to the line segment connecting between the observer's eyes, the display displays, for example, an image I3a shown in FIG. 11.

If this tilt is small, or if, for example, the plane perpendicular to the line segment connecting between the observer's eyes is in an angular range θ1 shown in FIG. 8, even the display of the comparative example can display a clear image. However, when the normal line is greatly tilted relative to the plane perpendicular to the line segment connecting between the observer's eyes, the comparative example displays a blurred image.

Specifically, when the normal line to the display is greatly tilted rightward relative to the plane perpendicular to the line segment connecting between the observer's eyes, or, for example, when the observer OB on the right in FIG. 8 observes the display 1, the display 1 presents an image I2b' shown in FIG. 12. When the normal line to the display is greatly tilted leftward relative to the plane perpendicular to the line segment connecting between the observer's eyes, or, for example, when the observer OB on the left in FIG. 8 observes the display 1, the display 1 can present an image I3b' shown in FIG. 13.

Specifically, if this tilt is great, or if the plane perpendicular to the line segment connecting between the observer's eyes is in an angular range θ2 or θ3 shown in FIG. 8, the comparative example displays a blurred image due to the overlap of the normal and ghost images.

In this regard, the display 1 described referring to FIGS. 1 to 7 is designed to emit second diffracted light and third diffracted light having an intensity lower than that of first diffracted light.

Accordingly, when the normal line to the display 1 is greatly tilted rightward relative to the plane perpendicular to the line segment connecting between the observer's eyes, or, for example, when the observer OB on the right in FIG. 8 observes the display 1, the display 1 can display an image I2b shown in FIG. 14. In other words, the display 1 can present the image I2b which is paler than the image I2b' shown in FIG. 12.

When the normal line to the display 1 is greatly tilted leftward relative to the plane perpendicular to the line segment connecting between the observer's eyes, or, for example, when the observer OB on the left in FIG. 8 observes the display 1, the display 1 can display an image I3b shown in FIG. 15. In other words, the display 1 can present the image I3b which is paler than the image I3b' shown in FIG. 13.

If the image becomes paler, the brightness of the ghost image lowers. Accordingly, the clarity of the image is less likely to be affected by the ghost image. Furthermore, if the image becomes paler, the blur due to the overlap of the normal and ghost images is unlikely to be perceived.

Accordingly, the display 1 can display a continuously changing image in a wide angular range without causing a feeling of unease to the observer.

The image presented by the display 1 may be, for example, a security pattern, an identification pattern or an authentication pattern. Examples of the security pattern may include stereoscopic images, geometric patterns, landmarks, landscapes, portraits, busts, sculptures, animals, birds, tropical fish or insects. In the case of portrait images having high definition in particular, the observer may easily perceive even a slight difference, if any, between a portrait displayed by a genuine product and a portrait displayed by a counterfeit product. Therefore, displays 1 displaying portraits contribute to easily determining authenticity. Also, in the case of landmark or landscape images having high definition in particular, the observer may easily perceive a difference, if any, between an image displayed by a genuine product and an image displayed by a counterfeit product even if the difference is only in a small portion. Therefore, displays 1 displaying landmarks or landscapes also contribute to easily determining authenticity.

Next, a second embodiment of the present invention will be described. The second embodiment is a specific version of any of the aspects set forth above.

Figure 16:
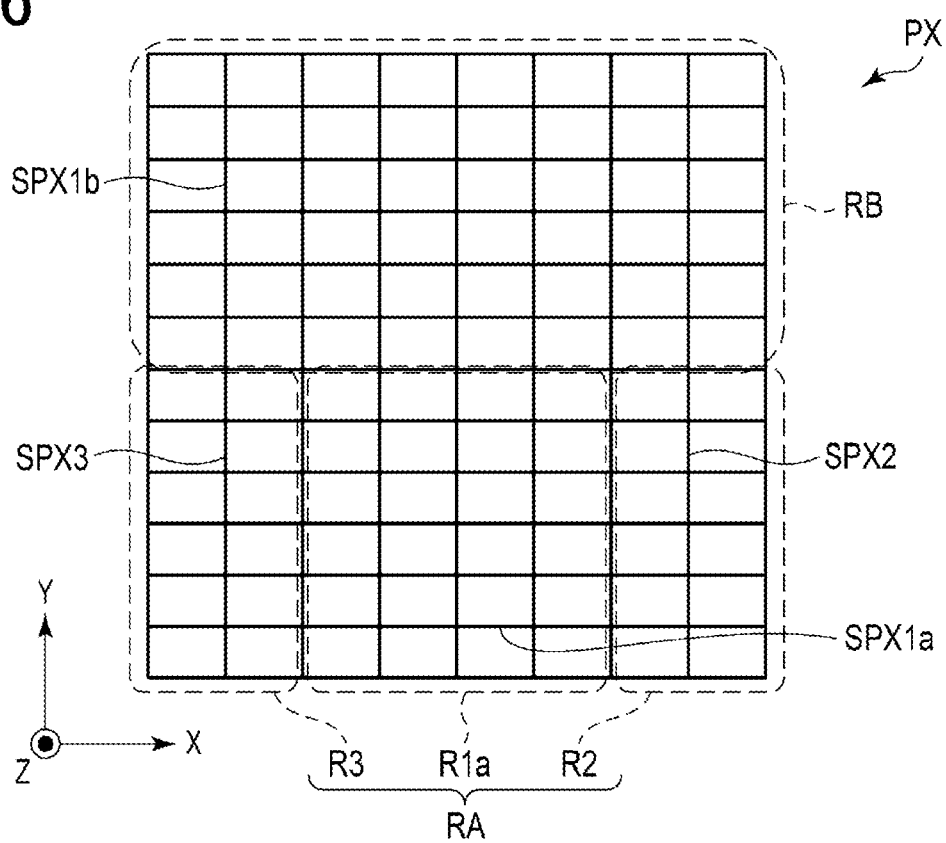
FIG. 16 is an enlarged plan view illustrating a pixel included in a display according to a second embodiment of the present invention.

FIG. 16 is an enlarged plan view illustrating a pixel included in a display according to the second embodiment of the present invention.

The display of the second embodiment is designed similarly to the display 1 of the first embodiment except that the following structure is used for each pixel PX.

As shown in FIG. 16, in the display of the second embodiment, each pixel PX includes a region RA for wide angle display and a region RB for narrow angle display.

The array of the regions RA has recorded thereon a plurality of images to be presented by the display 1 under low-to-high angle observation conditions. For example, when the Z direction is greatly tilted relative to the plane perpendicular to the line segment connecting between the observer's eyes and is then reversely greatly tilted relative to this plane, with the illumination direction, the observation direction and the Y direction being maintained constant, the array of the regions RA sequentially displays a plurality of images with a slight difference therebetween in shape and/or position.

The region RA includes a region R1a in addition to the second and third regions R2 and R3 described in the first embodiment.

The array of the regions R1a has recorded thereon a plurality of images to be presented by the display 1 under low-angle observation conditions. For example, when the Z direction is parallel to the plane perpendicular to the line segment connecting between the observer's eyes and is then gradually increased in angle relative to this plane, with the illumination direction, the observation direction and the Y direction being maintained constant, the array of the first regions R1a sequentially displays a plurality of images with a slight difference therebetween in shape and/or position.

Each region R1a includes a plurality of subpixels SPX1a. If illumination is applied to the subpixels SPX1a from the normal direction, no diffracted light emerges therefrom, or first diffracted light emerges therefrom in a first angular range.

One subpixel SPX1a included in each pixel PX is used as an image element included in one of the plurality of images to be displayed by the array of the regions R1a. Another subpixel SPX1a included in each pixel PX is used as an image element included in another one of the plurality of images to be displayed by the array of the regions R1a. Thus, the plurality of subpixels SPX1a in each pixel PX respectively correspond to the image elements of the plurality of images to be displayed by the array of the regions R1a.

The subpixels SPX1a emitting no diffracted light include no diffraction grating. The subpixels SPX1a which emit first diffracted light include, for example, a diffraction grating DG shown in FIG. 4. The diffraction grating DG is a relief diffraction grating formed of a plurality of crests or troughs PR arrayed in the width direction. If one pixel PX includes two or more subpixels SPX1a emitting the first diffracted light, these subpixels SPX1a have the diffraction grating DG in which the length directions of the crests or troughs PR are slightly different from each other. In the diffraction grating DG of the subpixels SPX1a, the angles of the length directions of the crests or troughs PR relative to the X direction are, for example, in the range of $-\alpha_1$ to $+\alpha_1$.

The subpixels SPX1a, second subpixels SPX2 and third subpixels SPX3 have respective areas equal to each other. The intensity of the first diffracted light emerging from the subpixels SPX1a is equal, for example, to those of the second diffracted light and the third diffracted light respectively emerging from the second and third subpixels SPX2 and SPX3.

The array of the regions RB has recorded thereon a plurality of images to be presented by the display 1 under low-angle observation conditions. For example, when the Z direction is parallel to the plane perpendicular to the line segment connecting between the observer's eyes and is then gradually increased in angle relative to this plane, with the illumination direction, the observation direction and the Y direction being maintained constant, the array of the regions RB sequentially displays a plurality of images with a slight difference therebetween in shape and/or position.

Each region RB includes a plurality of third subpixels SPX1b. If illumination is applied to the subpixels SPX1b from the normal direction, no diffracted light emerges therefrom, or first diffracted light emerges therefrom in a first angular range.

One subpixel SPX1b included in each pixel PX is used as an image element included in one of the plurality of images to be displayed by the array of the regions RB. Another subpixel SPX1b included in each pixel PX is used as an image element included in another one of the plurality of images to be displayed by the array of the regions RB. Thus, the plurality of subpixels SPX1b in each pixel PX respectively correspond to the image elements of the plurality of images to be displayed by the array of the regions RB.

Subpixels SPX1b emitting no diffracted light include no diffraction grating. Subpixels SPX1b which emit first diffracted light include, for example, a diffraction grating DG shown in FIG. 4. The diffraction grating DG is a relief diffraction grating formed of a plurality of crests or troughs PR arrayed in the width direction. If one pixel PX includes two or more subpixels SPX1b emitting the first diffracted light, these subpixels SPX1b have a diffraction grating DG in which the length directions of the crests or troughs PR are slightly different from each other. In the diffraction grating DG of the subpixels SPX1b, the angles of the length directions of the crests or troughs PR relative to the X direction are, for example, in the range of $-\alpha 1$ to $+\alpha 1$.

The subpixels SPX1b emitting the first diffracted light are different from the subpixels SPX1a emitting the first diffracted light. The difference lies in the angles of the length directions of the crests or troughs PR of the diffraction grating DG relative to the X direction. One or more subpixels SPX1b emitting the first diffracted light may have the same angles of the length directions of the crests or troughs PR of the diffraction grating DG relative to the X direction, as those of the subpixels SPX1a emitting the first diffracted light.

The subpixels SPX1b and subpixels SPX1a have respective areas equal to each other. Each subpixel SPX1b may have an area different from that of each subpixel SPX1a.

The display of the second embodiment can also display a continuously changing image in a wide angular range without causing a feeling of unease to the observer, similarly to the display 1 of the first embodiment. This will be described below.

If the minimum value of difference between emergence angles of the first diffracted light is reduced, the first image may be more smoothly changed according to the observation direction. If the minimum value of difference between emergence angles of the second diffracted light is increased, smooth change of the second image according to the observation direction may be deteriorated. If the minimum value of difference between emergence angles of the third diffracted light is increased, smooth change of the third images with changes of the observation direction may be deteriorated.

However, if the minimum value of difference between emergence angles of the first diffracted light is reduced, brightness may be increased accordingly in the continuously changing image expressed by a plurality of first images which are sequentially displayed as the observation direction or the like is changed. Contrarily, if the minimum value of difference between emergence angles of the second diffracted light is increased, paleness may be increased accordingly in the continuously changing image expressed by a plurality of second images which are sequentially displayed as the observation direction or the like is changed. Similarly, if the minimum value of difference between emergence angles of the third diffracted light is increased, paleness may be increased accordingly in the continuously changing image expressed by the plurality of first images which are sequentially displayed with changes of the observation direction or the like.

Accordingly, even if smoothness is low in changes of the second and third images with changes of the observation direction, the observer is unlikely to feel uneasy due to the low smoothness. Furthermore, when observing the second or third images, the ghost images are less likely to affect the image clarity because the ghost images have lower brightness. If the image becomes paler, the blur due to the overlap of the normal and ghost images is unlikely to be perceived accordingly.

Thus, according to this display, the ratio of the total area of the second and third subpixels to the area of each pixel can be reduced, and accordingly, the ratio of the total area of the subpixels SPX1a and SPX1b to the area of each pixel can be increased. Thus, according to this display, for example, the first images can be smoothly changed without causing a feeling of unease to the observer. In other words, this display can display a continuously changing image in a wide angular range without causing a feeling of unease to the observer.

The advantageous effects set forth above will be further described referring to Tables 1 to 6.

Tables 1 and 2 respectively show configurations that can be used for displays according to Comparative Examples 1 and 2. Table 3 shows a configuration of a display according to Example 1. Tables 4 and 5 show a configuration of a display according to Example 2. Table 6 shows summary of the configurations of the displays according to Comparative Examples 1 and 2 and Examples 1 and 2.

In Table 6, the "angular range" indicates a difference between the maximum and minimum values of the angles of the length directions of the crests or troughs of the diffraction grating provided to the subpixels, relative to the lateral direction of the display. In Table 6, the "angle differences" indicates differences in the angles of the length directions of the crests or troughs of the diffraction grating provided to the subpixels relative to the lateral direction of the display between subpixels, among subpixels.

TABLE 1

| Sub-pixel | Angle (°) |
| --- | --- |
| 1 | −25.00 |
| 2 | −23.28 |
| 3 | −21.55 |
| 4 | −19.83 |
| 5 | −18.10 |
| 6 | −16.38 |
| 7 | −14.66 |
| 8 | −12.93 |
| 9 | −11.21 |
| 10 | −9.48 |
| 11 | −7.76 |
| 12 | −6.03 |
| 13 | −4.31 |
| 14 | −2.59 |
| 15 | −0.86 |
| 16 | +0.86 |
| 17 | +2.59 |
| 18 | +4.31 |
| 19 | +6.03 |
| 20 | +7.76 |
| 21 | +9.48 |
| 22 | +11.21 |
| 23 | +12.93 |
| 24 | +14.66 |
| 25 | +16.38 |
| 26 | +18.10 |
| 27 | +19.83 |
| 28 | +21.55 |
| 29 | +23.28 |
| 30 | +25.00 |

TABLE 2

| Sub-pixel | Angle (°) |
| --- | --- |
| 1 | −25.00 |
| 2 | −23.98 |
| 3 | −22.96 |
| 4 | −21.94 |
| 5 | −20.92 |
| 6 | −19.90 |
| 7 | −18.88 |
| 8 | −17.86 |
| 9 | −16.84 |
| 10 | −15.82 |
| 11 | −14.80 |
| 12 | −13.78 |
| 13 | −12.76 |
| 14 | −11.73 |
| 15 | −10.71 |
| 16 | −9.69 |
| 17 | −8.67 |
| 18 | −7.65 |
| 19 | −6.63 |
| 20 | −5.61 |
| 21 | −4.59 |
| 22 | −3.57 |
| 23 | −2.55 |
| 24 | −1.53 |
| 25 | −0.51 |
| 26 | +0.51 |
| 27 | +1.53 |
| 28 | +2.55 |
| 29 | +3.57 |
| 30 | +4.59 |
| 31 | +5.61 |
| 32 | +6.63 |
| 33 | +7.65 |
| 34 | +8.67 |
| 35 | +9.69 |
| 36 | +10.71 |
| 37 | +11.73 |
| 38 | +12.76 |
| 39 | +13.78 |
| 40 | +14.80 |
| 41 | +15.82 |
| 42 | +16.84 |
| 43 | +17.86 |
| 44 | +18.88 |
| 45 | +19.90 |
| 46 | +20.92 |
| 47 | +21.94 |
| 48 | +22.96 |
| 49 | +23.98 |
| 50 | +25.00 |

TABLE 3

| Sub-pixel | Angle (°) |
| --- | --- |
| 1 | −25.00 |
| 2 | −23.28 |
| 3 | −21.55 |
| 4 | −19.83 |
| 5 | −18.10 |
| 6 | −16.38 |
| 7 | −14.66 |
| 8 | −12.93 |
| 9 | −11.21 |
| 10 | −9.48 |
| 11 | −7.76 |
| 12 | −6.03 |
| 13 | −4.31 |
| 14 | −2.59 |
| 15 | −0.86 |
| 16 | +0.86 |
| 17 | +2.59 |
| 18 | +4.31 |
| 19 | +6.03 |
| 20 | +7.76 |
| 21 | +9.48 |
| 22 | +11.21 |
| 23 | +12.93 |
| 24 | +14.66 |
| 25 | +16.38 |
| 26 | +18.10 |
| 27 | +19.83 |
| 28 | +21.55 |
| 29 | +23.28 |
| 30 | +25.00 |
| 31 | −15.00 |
| 32 | −13.97 |
| 33 | −12.93 |
| 34 | −11.90 |
| 35 | −10.86 |
| 36 | −9.83 |
| 37 | −8.79 |
| 38 | −7.76 |
| 39 | −6.72 |
| 40 | −5.69 |
| 41 | −4.66 |
| 42 | −3.62 |
| 43 | −2.59 |
| 44 | −1.55 |
| 45 | −0.52 |
| 46 | +0.52 |

TABLE 3-continued

| Sub-pixel | Angle (°) |
| --- | --- |
| 47 | +1.55 |
| 48 | +2.59 |
| 49 | +3.62 |
| 50 | +4.66 |
| 51 | +5.69 |
| 52 | +6.72 |
| 53 | +7.76 |
| 54 | +8.79 |
| 55 | +9.83 |
| 56 | +10.86 |
| 57 | +11.90 |
| 58 | +12.93 |
| 59 | +13.97 |
| 60 | +15.00 |

TABLE 4

| Sub-pixel | Angle (°) |
| --- | --- |
| 1 | −25.00 |
| 2 | −23.98 |
| 3 | −22.96 |
| 4 | −21.94 |
| 5 | −20.92 |
| 6 | −19.90 |
| 7 | −18.88 |
| 8 | −17.86 |
| 9 | −16.84 |
| 10 | −15.82 |
| 11 | −14.80 |
| 12 | −13.78 |
| 13 | −12.76 |
| 14 | −11.73 |
| 15 | −10.71 |
| 16 | −9.69 |
| 17 | −8.67 |
| 18 | −7.65 |
| 19 | −6.63 |
| 20 | −5.61 |
| 21 | −4.59 |
| 22 | −3.57 |
| 23 | −2.55 |
| 24 | −1.53 |
| 25 | −0.51 |
| 26 | +0.51 |
| 27 | +1.53 |
| 28 | +2.55 |
| 29 | +3.57 |
| 30 | +4.59 |
| 31 | +5.61 |
| 32 | +6.63 |
| 33 | +7.65 |
| 34 | +8.67 |
| 35 | +9.69 |
| 36 | +10.71 |
| 37 | +11.73 |
| 38 | +12.76 |
| 39 | +13.78 |
| 40 | +14.80 |
| 41 | +15.82 |
| 42 | +16.84 |
| 43 | +17.86 |
| 44 | +18.88 |
| 45 | +19.90 |
| 46 | +20.92 |
| 47 | +21.94 |
| 48 | +22.96 |
| 49 | +23.98 |
| 50 | +25.00 |

TABLE 5

| Sub-pixel | Angle (°) |
| --- | --- |
| 51 | −15.00 |
| 52 | −14.39 |
| 53 | −13.78 |
| 54 | −13.16 |
| 55 | −12.55 |
| 56 | −11.94 |
| 57 | −11.33 |
| 58 | −10.71 |
| 59 | −10.10 |
| 60 | −9.49 |
| 61 | −8.88 |
| 62 | −8.27 |
| 63 | −7.65 |
| 64 | −7.04 |
| 65 | −6.43 |
| 66 | −5.82 |
| 67 | −5.20 |
| 68 | −4.59 |
| 69 | −3.98 |
| 70 | −3.37 |
| 71 | −2.76 |
| 72 | −2.14 |
| 73 | −1.53 |
| 74 | −0.92 |
| 75 | −0.31 |
| 76 | +0.31 |
| 77 | +0.92 |
| 78 | +1.53 |
| 79 | +2.14 |
| 80 | +2.76 |
| 81 | +3.37 |
| 82 | +3.98 |
| 83 | +4.59 |
| 84 | +5.20 |
| 85 | +5.82 |
| 86 | +6.43 |
| 87 | +7.04 |
| 88 | +7.65 |
| 89 | +8.27 |
| 90 | +8.88 |
| 91 | +9.49 |
| 92 | +10.10 |
| 93 | +10.71 |
| 94 | +11.33 |
| 95 | +11.94 |
| 96 | +12.55 |
| 97 | +13.16 |
| 98 | +13.78 |
| 99 | +14.39 |
| 100 | +15.00 |

TABLE 6

| | | Comparative Example 1 | Comparative Example 2 | Example 1 | Example 2 |
|---|---|---|---|---|---|
| Number of subpixels | | 30 | 50 | 60 | 100 |
| Angular range (°) | | 50 | 50 | 50 | 50 |
| Angle difference (°) | Pixel | 1.72 | 1.02 | — | — |
| | First subpixels | | | −0.34 to 1.03 (Average 0.64) | 0.20 to 0.61 (Average 0.37) |
| | Second subpixels | | | 1.72 (Average 1.72) | 1.02 (Average 1.02) |
| | Third subpixels | | | 1.72 (Average 1.72) | 1.02 (Average 1.02) |

Table 1 shows Comparative Example 1 as an example of a configuration that can be used for the case of arranging 30 subpixels in each pixel. Specifically, Table 1 shows angles of the length directions of the crests or troughs of the diffraction grating provided to 30 subpixels in a display according to a comparative example, where the minimum and maximum values of the angles of the crests or troughs relative to the lateral direction of the display are respectively −25° and +25°.

When 30 subpixels are arranged in each pixel and the angular range is set to −25° to +25° as shown in Table 1, the angle difference exceeds 1.7° as shown in Table 6 among the subpixels. In other words, with this configuration, there is a great difference in emergence angle of the diffracted light among the subpixels. Accordingly, the image presented by the display using this configuration does not smoothly change when the observation angle or the like is changed. Furthermore, if this configuration is used, the image may appear to be blurred due to the overlap of the normal and ghost images.

If the angular range is set to −15° to +15° with the number of subpixels arranged in each pixel unchanged as 30, the display using this configuration may allow the diffracted light to emerge only in the low-angle region. Therefore, the impact of the overlap of the normal and ghost images on the image clarity is very small.

Also, the display using this configuration can reduce the angle difference among the subpixels more than in the display of Comparative Example 1.

However, if this configuration is used, the angle difference among the subpixels may exceed 1°. In other words, even with this configuration, there may be a great difference in emergence angle of the diffracted light among the subpixels. Accordingly, the image presented by the display using this configuration does not smoothly change when the observation angle or the like is changed.

If the emergence angle range is narrow, only a slight change of the observation angle or the like may prevent the observer from sensing changes in shape and position of the image.

Therefore, a display using such a configuration may cause a feeling of unease to the observer.

Table 2 shows Comparative Example 2 as an example of a configuration that can be used for the case of arranging 50 subpixels in each pixel. Specifically, Table 2 shows angles of the length directions of the crests or troughs of the diffraction grating provided to 50 subpixels in a display according to a comparative example, where the minimum and maximum values of the angles of the crests or troughs relative to the lateral direction of the display are respectively −25° and +25°.

As shown in Table 2, since the angular range is −25° to +25°, the observer can perceive changes in shape and position of the image if the observation direction or the like is greatly changed.

However, if this configuration is used, the angle difference among the subpixels may also exceed 1° as shown in Table 6. In other words, with this configuration, there is also a great difference in emergence angle of the diffracted light among the subpixels. Accordingly, the image presented by the display using this configuration does not smoothly change when the observation angle or the like is changed. Furthermore, if this configuration is used, the image may appear to be blurred due to the overlap of the normal and ghost images.

Table 3 shows Example 1 as an example of a configuration that can be used for the pixel PX shown in FIG. 16. In this example, there are arranged 6 second subpixels SPX2, 6 third subpixels SPX3, 18 subpixels SPX1a and 30 subpixels SPX1b in each pixel PX. In Table 3, the 1st to 6th subpixels are the third subpixels SPX3, the 7th to 24th subpixels are subpixels SPX1a, and the 25th to 30th subpixels are the second subpixels SPX2. In Table 3, the 31st to 60th subpixels are the subpixels SPX1b.

In this configuration, the angles of the length directions of the crests or troughs PR of the diffraction gratings DG contained in the subpixels SPX1a and SPX1b, relative to the X direction are in the range of −15° to +15°. The angle difference among the subpixels SPX1a and SPX1b is less than 1° on average. In other words, the difference in emergence angle of the diffracted light is very small among the subpixels SPX1a and SPX1b. Accordingly, the image presented by the display using this configuration changes smoothly when the observation angle or the like is changed in low-angle range. In the display using this configuration, the subpixels SPX1a and SPX1b allow the diffracted light to emerge only in the low-angle range. Therefore, the impact of the overlap of the normal and ghost images on the clarity of the image displayed by the subpixels SPX1a and SPX1b is very small.

In this configuration, diffracted light emerging from the subpixels SPX1a and SPX1b is in a low-angle range, while diffracted light emerging from the second and third subpixels SPX2 and SPX3 is in a wide-angle range. Therefore, if the observation angle or the like is greatly changed, the observer can perceive changes in shape and position of the image.

Moreover, in this configuration, the continuously changing image expressed in the wide-angle range is paler than the continuously changing image expressed in the low-angle range. Therefore, even if smoothness in changes of the images is low in the wide angular range, the observer may be unlikely to feel uneasy due to the low smoothness and may perceive no blur that would be caused by the overlap of the normal and ghost images.

Thus, the display using this configuration can reduce the ratio of the total area of the second and third subpixels SPX2 and SPX3 to the area of each pixel PX, and thus can increase the ratio of the total area of the subpixels SPX1$a$ and SPX1$b$ to the area of each pixel PX. Thus, according to this display, for example, images can be smoothly changed without causing a feeling of unease to the observer. In other words, this display can display a continuously changing image in a wide angular range without causing a feeling of unease to the observer.

Tables 4 and 5 show Example 2 as another example of a configuration that can be used for the pixel PX shown in FIG. 16. In this example, there are arranged 10 second subpixels SPX2, 10 third subpixels SPX3, 30 subpixels SPX1$a$ and 50 subpixels SPX1$b$ in each pixel PX. In Table 4, the 1st to 10th subpixels are the third subpixels SPX3, the 11th to 40th subpixels are subpixels SPX1$a$, and the 41st to 50th subpixels are the second subpixels SPX2. In Table 5, the 51st to 100th subpixels are the subpixels SPX1$b$.

According to this display, for example, images can be smoothly changed without causing a feeling of unease to the observer, similarly to the display of Example 1. In other words, this display can display a continuously changing image in a wide angular range without causing a feeling of unease to the observer.

In this display, a greater number of subpixels are arranged in each pixel than in the display of Example 1. Accordingly, this display can achieve smoother image changes when changing the observation direction or the like than in the display of Example 1.

The displays of the first and second embodiments can be variously modified.

Figure 17:
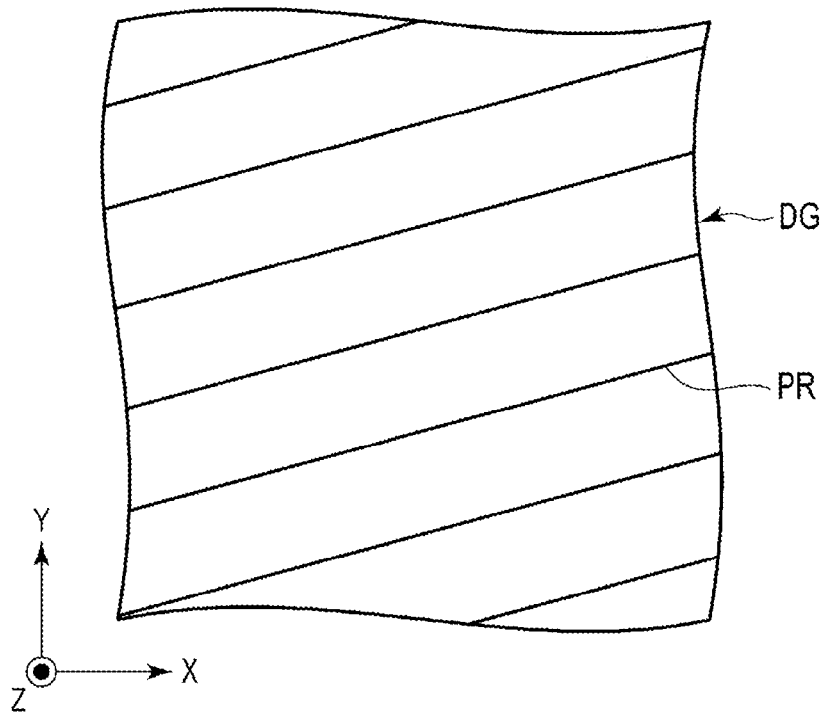
FIG. 17 is an enlarged schematic plan view illustrating an example of a structure which can be used for subpixels.
Figure 18:
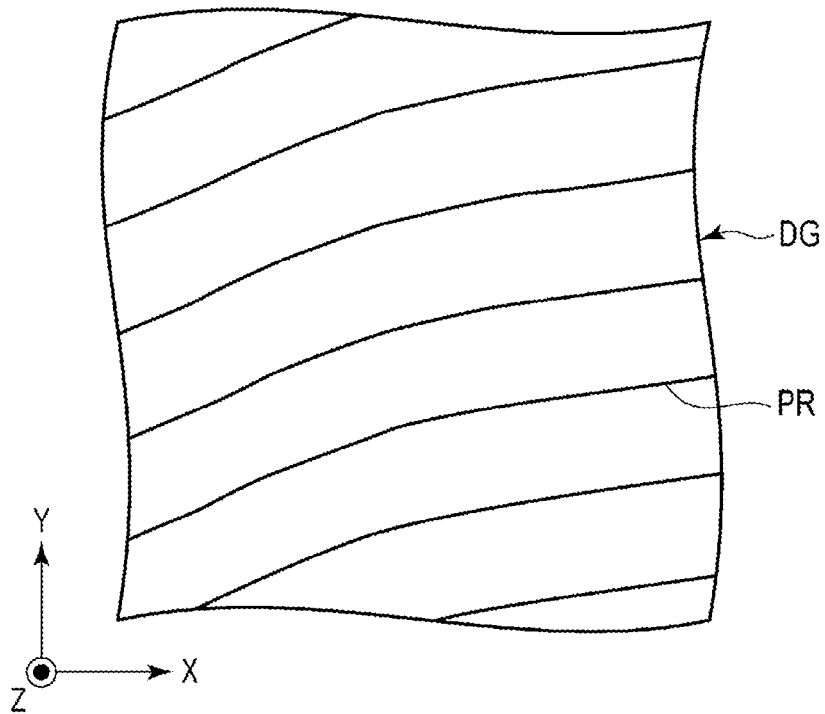
FIG. 18 is an enlarged schematic plan view illustrating another example of a structure which can be used for subpixels.

FIG. 17 is an enlarged schematic plan view illustrating an example of a structure which can be used for subpixels. FIG. 18 is an enlarged schematic plan view illustrating another example of a structure which can be used for subpixels.

As shown in FIG. 17, the first and second embodiments are each configured to include a diffraction grating DG having straight crests or troughs PR. The crests or troughs PR do not necessarily have to be straight. For example, as shown in FIG. 18, the crests or troughs PR may be curved lines, such as arcs. In this case, the length direction of each crest or trough PR corresponds to a length direction of an approximate straight line of each curved line.

Next, a third embodiment of the present invention will be described. The third embodiment is a specific version of any of the aspects set forth above.

Figure 19:
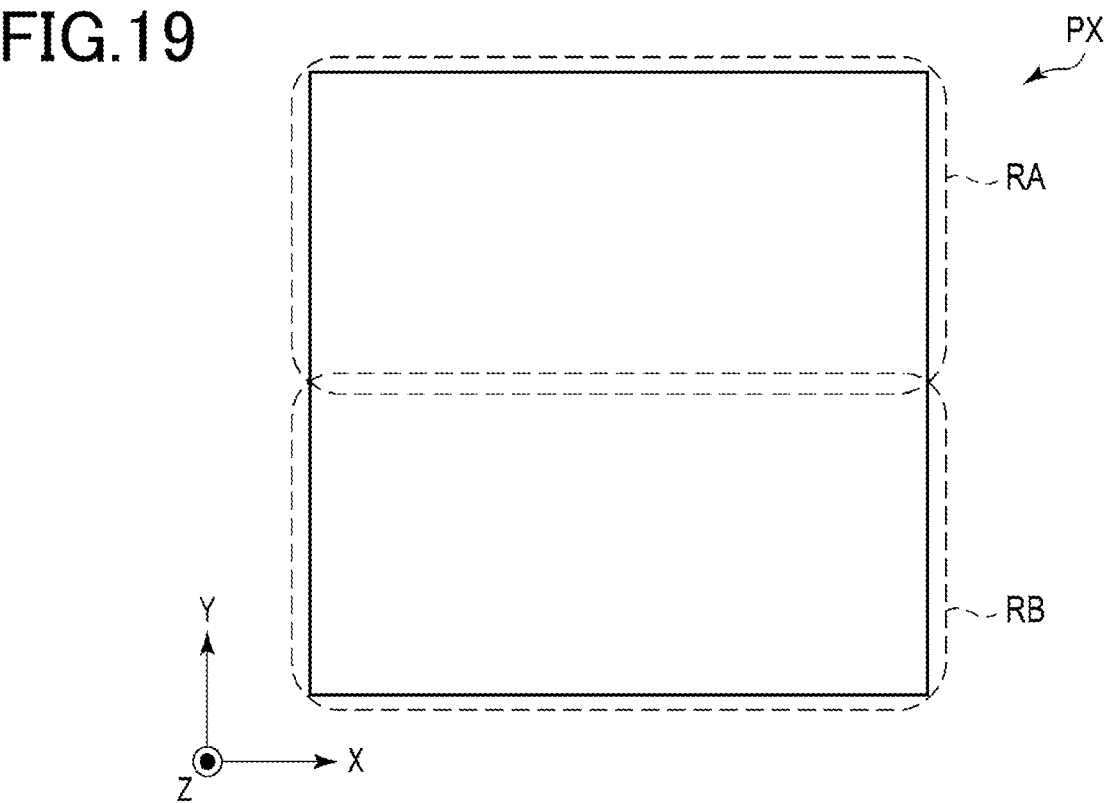
FIG. 19 is an enlarged plan view illustrating a pixel included in a display according to a third embodiment of the present invention.
Figure 20:
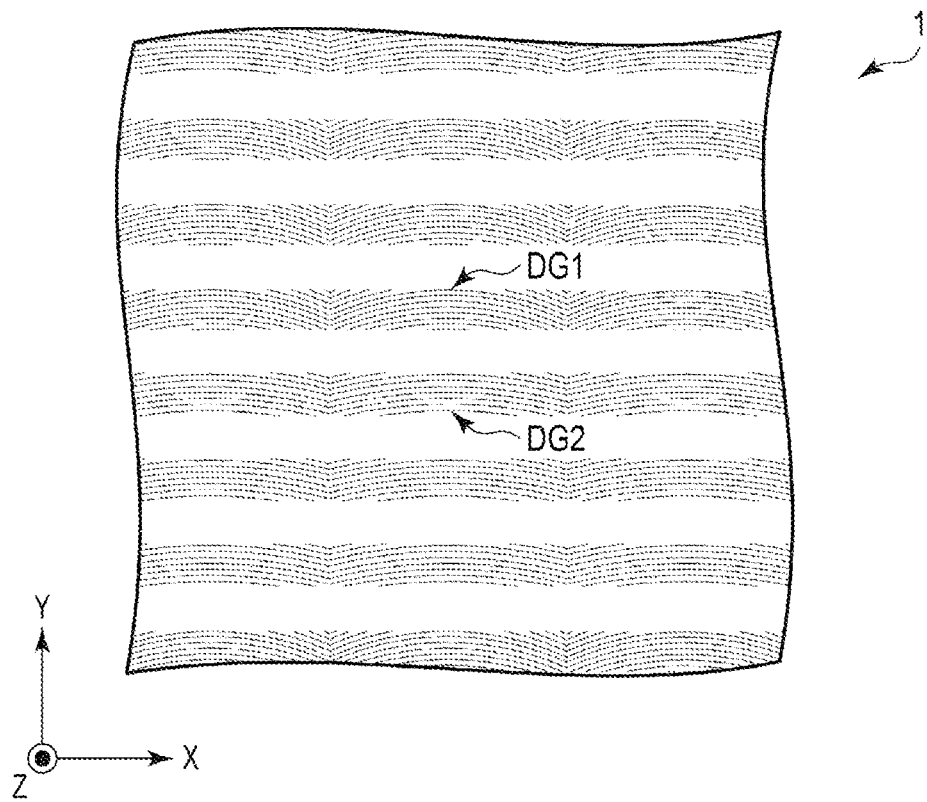
FIG. 20 is a partial enlarged plan view illustrating the display according to the third embodiment of the present invention.
Figure 21:
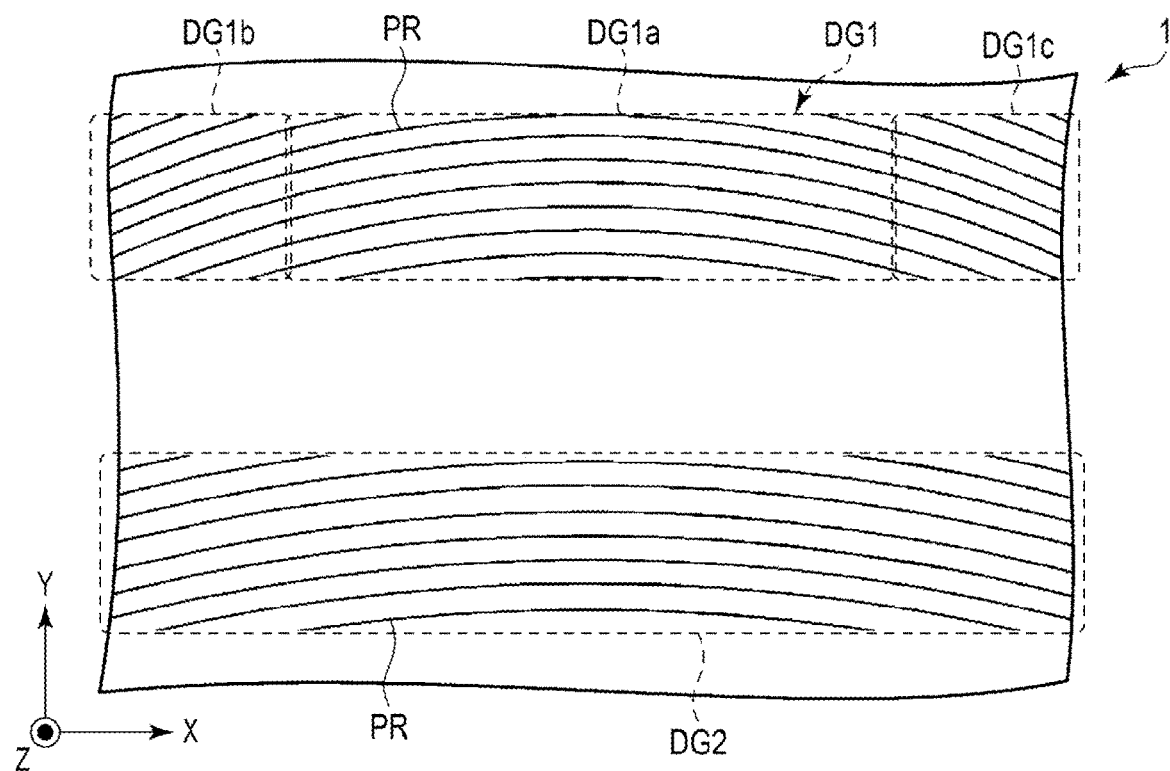
FIG. 21 is an enlarged plan view illustrating an example of pixels included in the display shown in FIG. 20.
Figure 22:
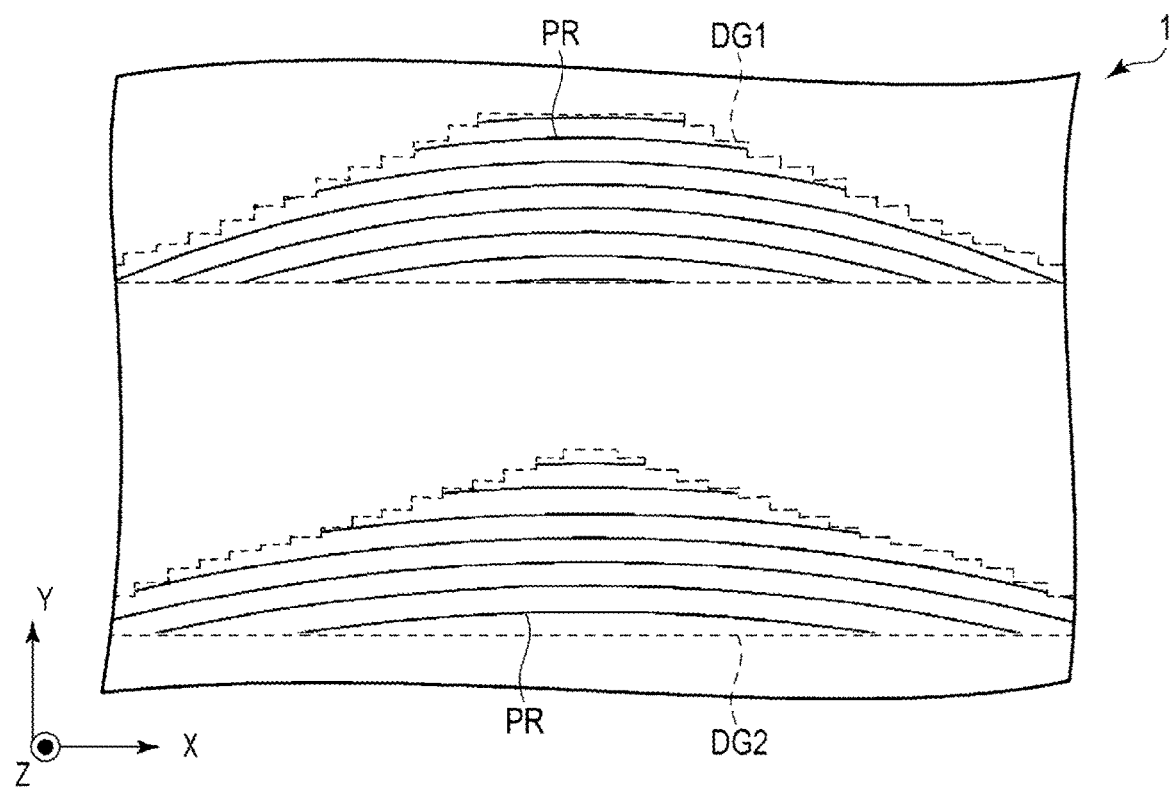
FIG. 22 is an enlarged plan view illustrating another example of pixels included in the display shown in FIG. 20.
Figure 23:
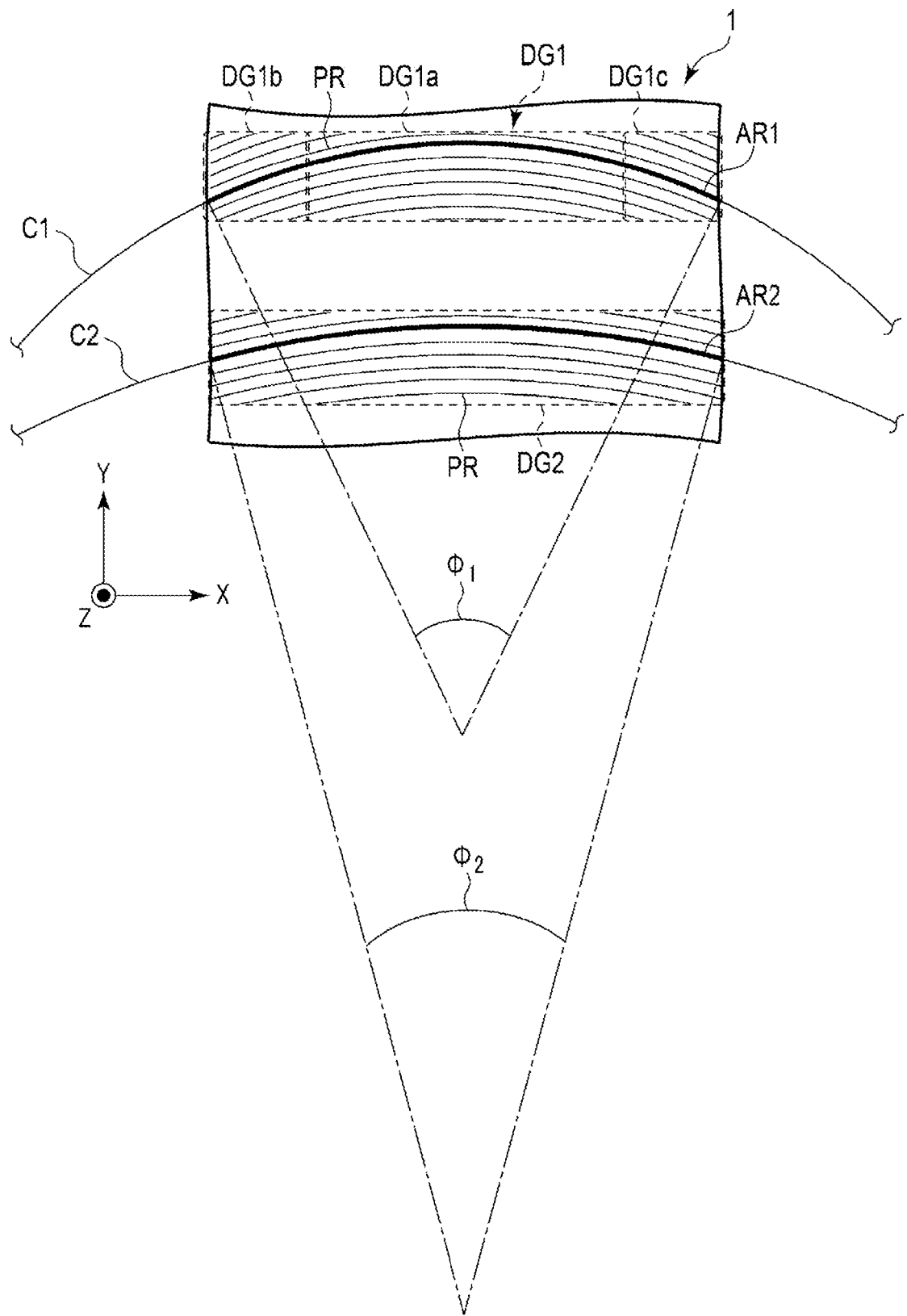
FIG. 23 is a plan view illustrating a relationship of pixels with first and second arcs shown in FIG. 21.
Figure 24:
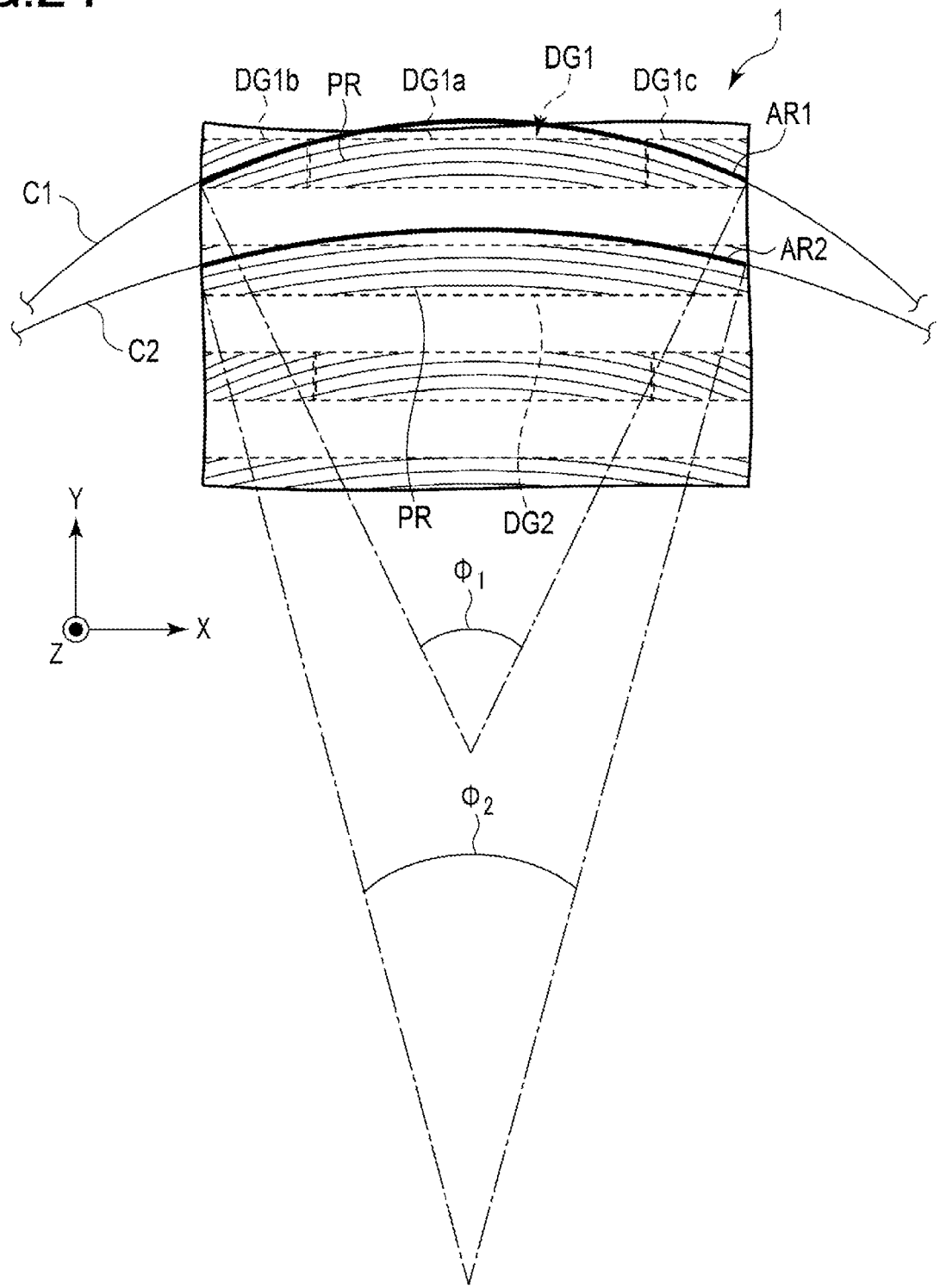
FIG. 24 is a plan view illustrating a relationship of pixels with first and second arcs according to a modification.

FIG. 19 is an enlarged plan view illustrating a pixel included in a display according to the third embodiment of the present invention. FIG. 20 is a partial enlarged plan view illustrating the display according to the third embodiment of the present invention. FIG. 21 is an enlarged plan view illustrating an example of pixels included in the display shown in FIG. 20. FIG. 22 is an enlarged plan view illustrating another example of pixels included in the display shown in FIG. 20. FIG. 23 is a plan view illustrating a relationship of pixels with first and second arcs shown in FIG. 21. FIG. 24 is a plan view illustrating a relationship of pixels with first and second arcs according to a modification.

In FIG. 21 or the like, the wide-range display region RA is separated from the narrow-range display region RB for the sake of clarity. The wide-range display region RA and the narrow-range display region RB may be separated from each other or may be adjacent to each other.

The display of the third embodiment is designed similarly to the display of the second embodiment except that the following structure is used for each pixel PX.

Specifically, in a display 1 of the third embodiment, the wide-range display region RA shown in FIG. 19 includes no diffraction grating, or includes the wide-range display diffraction grating DG1 shown in FIGS. 20 to 23. As shown in FIGS. 21 to 23, the diffraction grating DG1 is formed of crests or troughs PR (first crests or troughs) curved in an arc and arrayed in the width direction (Y direction). As shown in FIG. 23, the arc formed by first crests or troughs is a first arc AR1 or a part of the first arc AR1 having a first center angle $\Phi_1$.

The narrow-range display region RB shown in FIG. 19 includes no diffraction grating, or includes the narrow-range display diffraction grating DG2 shown in FIGS. 20 to 23. As shown in FIGS. 21 to 23, the diffraction grating DG2 is formed of crests or troughs PR (second crests or troughs) curved in an arc and arrayed in the width direction (Y direction). As shown in FIG. 23, the arc formed by second crests or troughs is a second arc AR2 or a part of the second arc AR2 having a second center angle $\Phi_2$.

Among the crests or troughs PR included in the plurality of pixels PX, the first arc AR1 is a smallest arc including one or more curved lines obtained by translating and overlapping the crests or troughs PR (first crests or troughs) included in the wide-range display regions RA shown in FIG. 19.

As shown in FIGS. 21 and 23, if the wide-range display diffraction grating DG1 is designed to emit diffracted light with maximum brightness across the angular range in any of the pixels PX, the pixel PX may contain first crests or troughs arrayed in the lateral direction (Y direction) and extending from first to second ends of the pixel PX. If the display 1 includes such a pixel PX, the first arc AR1 corresponds to the first crests or troughs extending from the first to second ends.

First crests or troughs extending from the first to second ends are not necessarily present in a pixel PX. As shown in FIG. 24, if one or more pixels PX include two first crests or troughs separated from each other on a first circle C1, one extending from first to second ends and the other from second to first ends, the shortest arc including the two first crests or troughs is the first arc AR1. In other words, one arc obtained by interpolating two arcs corresponding to the two first crests or troughs is the first arc AR1.

Among the crests or troughs PR included in the plurality of pixels PX, the second arc AR2 is a smallest arc including one or more curved lines obtained by translating and overlapping the crests or troughs PR (second crests or troughs) included in the narrow-range display regions RB shown in FIG. 19.

As shown in FIGS. 21 and 23, if the narrow-range display diffraction grating DG2 is designed to emit diffracted light with maximum brightness across the angular range in any of the pixels PX, the pixel PX may contain second crests or troughs arrayed in the lateral direction (Y direction) and extending from first to second ends of the pixel PX. If the display 1 includes such a pixel PX, the second arc AR2 corresponds to the second crests or troughs extending from the first to second ends.

Second crests or troughs extending from the first to second ends are not necessarily present in a pixel PX. As shown in FIG. 24, if one or more pixels PX include two second crests or troughs separated from each other on a second circle C2, one extending from first to second ends and the other from second to first ends, the shortest arc including the two second crests or troughs is the second arc AR2. In other words, one arc obtained by interpolating two arcs corresponding to the two second crests or troughs is the second arc AR2.

The second center angle $\Phi_2$ of the second arc AR2 is smaller than the first center angle $\Phi_1$ of the first arc AR1. The second arc AR2 has a curvature smaller than that of the first arc AR1. In other words, the second circle C2 including the second arc AR2 has a radius larger than that of the first circle C1 including the first arc AR1.

The regions RA and RB shown in FIG. 19 include a plurality of subpixels arrayed in a direction (X direction) perpendicular to the width direction (Y direction). In the regions RA and RB, the plurality of subpixels contribute to displaying a plurality of images observed from different directions.

Of these subpixels, those which are arrayed at a center portion DG1a of the diffraction grating DG1 shown in FIGS. 21 and 23 correspond to the subpixels SPX1a described referring to FIG. 16. Of these subpixels, those which are arrayed at an end portion DG1b of the diffraction grating DG1 shown in FIGS. 21 and 23 correspond to the subpixels SPX2 described referring to FIG. 16, and those which are arrayed at an end portion DG1c of the diffraction grating DG1 shown in FIGS. 21 and 23 correspond to the subpixels SPX3 described referring to FIG. 16. Of these subpixels, those which are arrayed in the diffraction grating DG2 shown in FIGS. 21 and 23 correspond to the subpixels SPX1b described referring to FIG. 16.

According to the display 1 of the third embodiment, for example, images can be smoothly changed without causing a feeling of unease to the observer, similarly to the display of the second embodiment. In other words, the display 1 can display a continuously changing image in a wide angular range without causing a feeling of unease to the observer.

The displays 1 of the first to third embodiments may use a configuration for displaying a monochrome image or a configuration for displaying a full color image.

Figure 25:
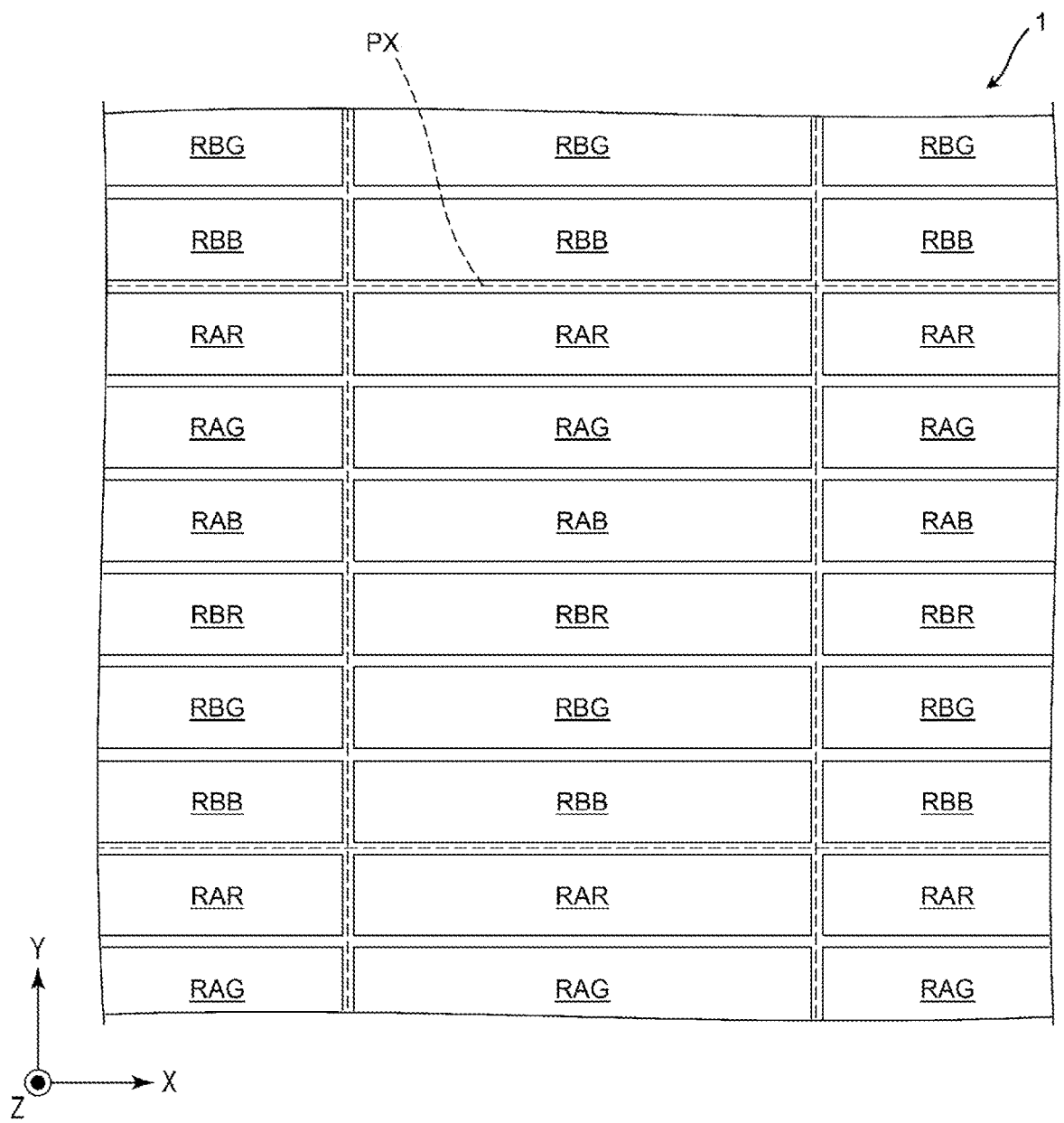
FIG. 25 is a schematic plan view illustrating an example of a structure which can be used for displaying a full color image.
Figure 26:
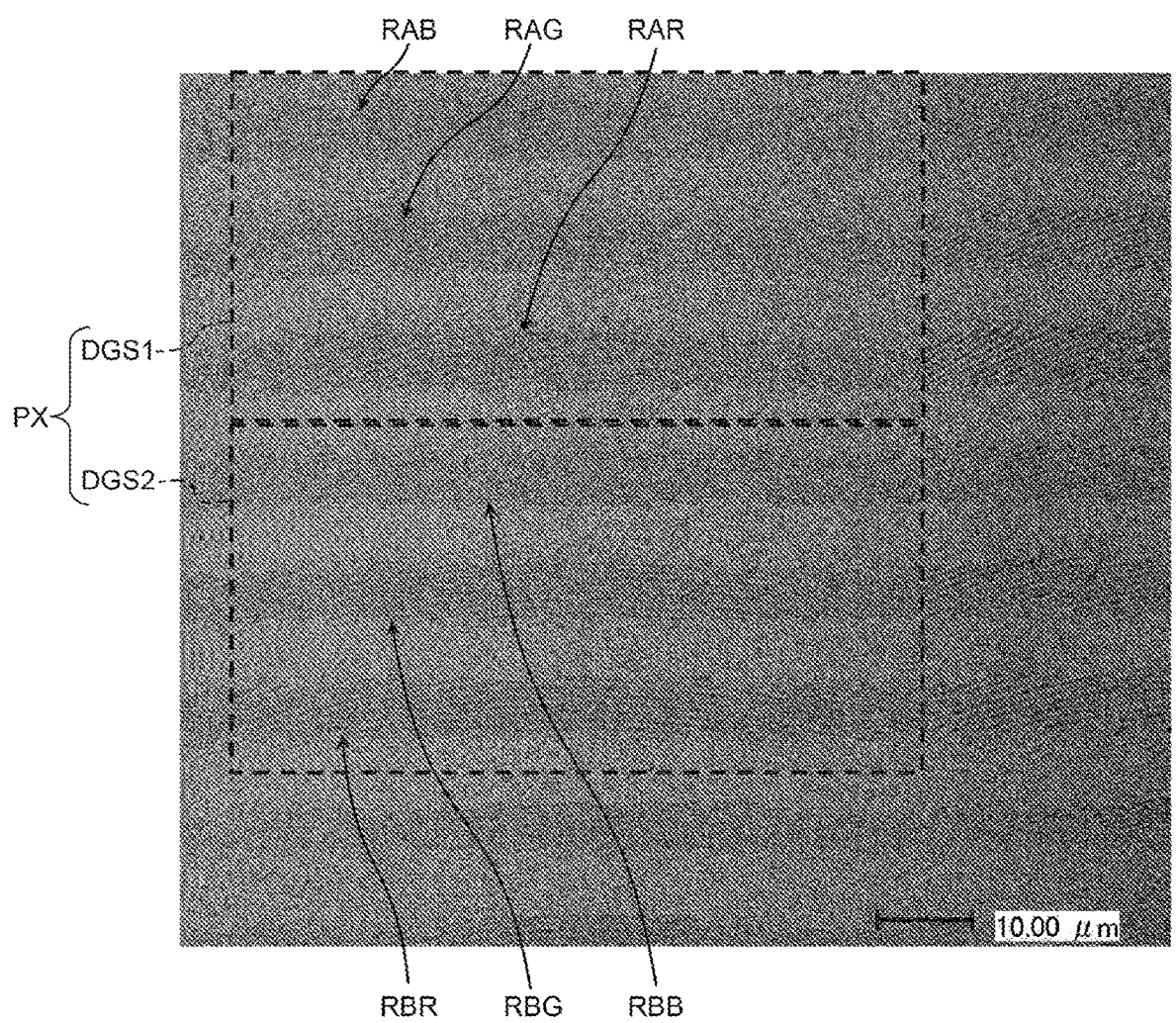
FIG. 26 is an electron micrograph of a display which uses a structure similar to the structure shown in FIG. 25.

FIG. 25 is a schematic plan view illustrating an example of a structure which can be used for displaying a full color image. The structure shown in FIG. 25 is the same as the structure described referring to FIGS. 19 to 22 except for the following points.

Specifically, in the structure shown in FIG. 25, each pixel PX includes the wide-range display region RA described referring to FIG. 19, including a wide-range display first sub-region RAR for red, a wide-range display second sub-region RAG for green and a wide-range display third sub-region RAB for blue.

In each pixel PX, the wide-range display sub-regions RAR, RAG and RAB each have a shape extended in a first direction intersecting the array direction of the crests or troughs PR, and are arrayed in a second direction intersecting the first direction. The wide-range display sub-regions RAR, RAG and RAB herein each have a shape extended in the X direction and are arrayed in the Y direction. In each pixel PX, the sub-regions RAR, RAG and RAB are arrayed in this order.

The wide-range display sub-regions RAR, RAG and RAB each are provided with the diffraction grating DG1 described referring to FIGS. 20 to 24, or provided with no diffraction grating. In the first sub-regions RAR, the diffraction grating DG1 has an equal first center angle $\Phi_1$, and the crests or troughs PR have an equal pitch. In the second sub-regions RAG, the diffraction grating DG1 has an equal first center angle $\Phi_1$, and the crests or troughs PR have an equal pitch. In the third sub-regions RAB, the diffraction grating DG1 has an equal first center angle $\Phi_1$, and the crests or troughs PR have an equal pitch. Between the first, second and third sub-regions RAR, RAG and RAB, the diffraction gratings DG1 have an equal first center $\Phi_1$, but the crests or troughs PR have different pitches.

In the structure shown in FIG. 25, each pixel PX further includes the narrow-range display region RB described referring to FIG. 19, including a narrow-range display fourth sub-region RBR for red, a narrow-range display fifth sub-region RBG for green and a narrow-range display sixth sub-region RBB for blue.

The narrow-range display sub-regions RBR, RBG and RBB each have a shape extended in the first direction and are arrayed in the second direction. The narrow-range display sub-regions RBR, RBG and RBB herein each have a shape extended in the X direction and are arrayed in the Y direction. In each pixel PX, the sub-regions RBR, RBG and RBB are arrayed in this order.

In each pixel PX, the column of the sub-regions RAR, RAG and RAB is adjacent to the column of the sub-regions RBR, RBG and RBB in the Y direction. The second and third sub-regions RAG and RAB are interposed between the first and fourth sub-regions RAR and RBR. The third and fourth sub-regions RAB and RBR are interposed between the second and fifth sub-regions RAG and RBG. The fourth and fifth sub-regions RBR and RBG are interposed between the third and sixth sub-regions RAB and RBB.

The narrow-range display sub-regions RBR, RBG and RBB are each provided with the diffraction grating DG2 described referring to FIGS. 20 to 24, or provided with no diffraction grating.

Among the fourth sub-regions RBR, the diffraction grating DG2 has an equal second center angle $\Phi_2$, and the crests or troughs PR have an equal pitch. The diffraction grating DG2 of the fourth sub-region RBR has crests or troughs PR whose pitch is equal to that of the diffraction grating DG1 of the first sub-region RAR.

Among the fifth sub-regions RBG, the diffraction grating DG2 has an equal second center angle $\Phi_2$, and the crests or troughs PR have an equal pitch. The diffraction grating DG2 of the fifth sub-regions RBG has crests or troughs PR whose pitch is equal to that of the diffraction grating DG1 of the second sub-region RAG.

Among the sixth sub-regions RBB, the diffraction grating DG2 has an equal second center angle $\Phi_2$, and the crests or troughs PR have an equal pitch. The diffraction grating DG2 of the sixth sub-regions RBB has crests or troughs PR whose pitch is equal to that of the diffraction grating DG1 of the third sub-region RAB.

Between the fourth, fifth and sixth sub-regions RBR, RBG and RBB, the diffraction gratings DG2 have an equal second center $\Phi_2$, but the crests or troughs PR have different pitches. Similar to the above, the second center angle $\Phi_2$ is smaller than the first center angle $\Phi_1$.

In this structure, the pixels are designed so that the display 1 can display a full color image as a diffraction image. Due to this design, the intensity ratio of diffracted light emerging from the wide-range display sub-regions RAR, RAG and RAB can be appropriately made different from the intensity ratio of diffracted light emerging from the narrow-range display sub-regions RBR, RBG and RBB.

In this structure, the wide-range display sub-regions RAR, RAG and RAB each have a shape extended in the first direction and are arrayed in the second direction, i.e., the width direction thereof. Therefore, if the sub-regions RAR, RAG and RAB are arranged close to each other in each pixel PX, the diffracted light emerging from these sub-regions is easily mixed.

In this structure, the narrow-range display sub-regions RBR, RBG and RBB each have a shape extended in the first direction and are arrayed in the second direction, i.e., the width direction thereof. Therefore, if the sub-regions RBR, RBG and RBB are arranged close to each other in each pixel PX, the diffracted light emerging from these sub-regions is easily mixed.

Accordingly, the display 1 using this structure can display a facial image such as of a person or an animal (e.g., lion or zebra) with high definition and as a diffraction image with reasonable vividness. In other words, the display 1 using the above structure can display a diffraction image that appears to be natural to the observer.

Figure 27:
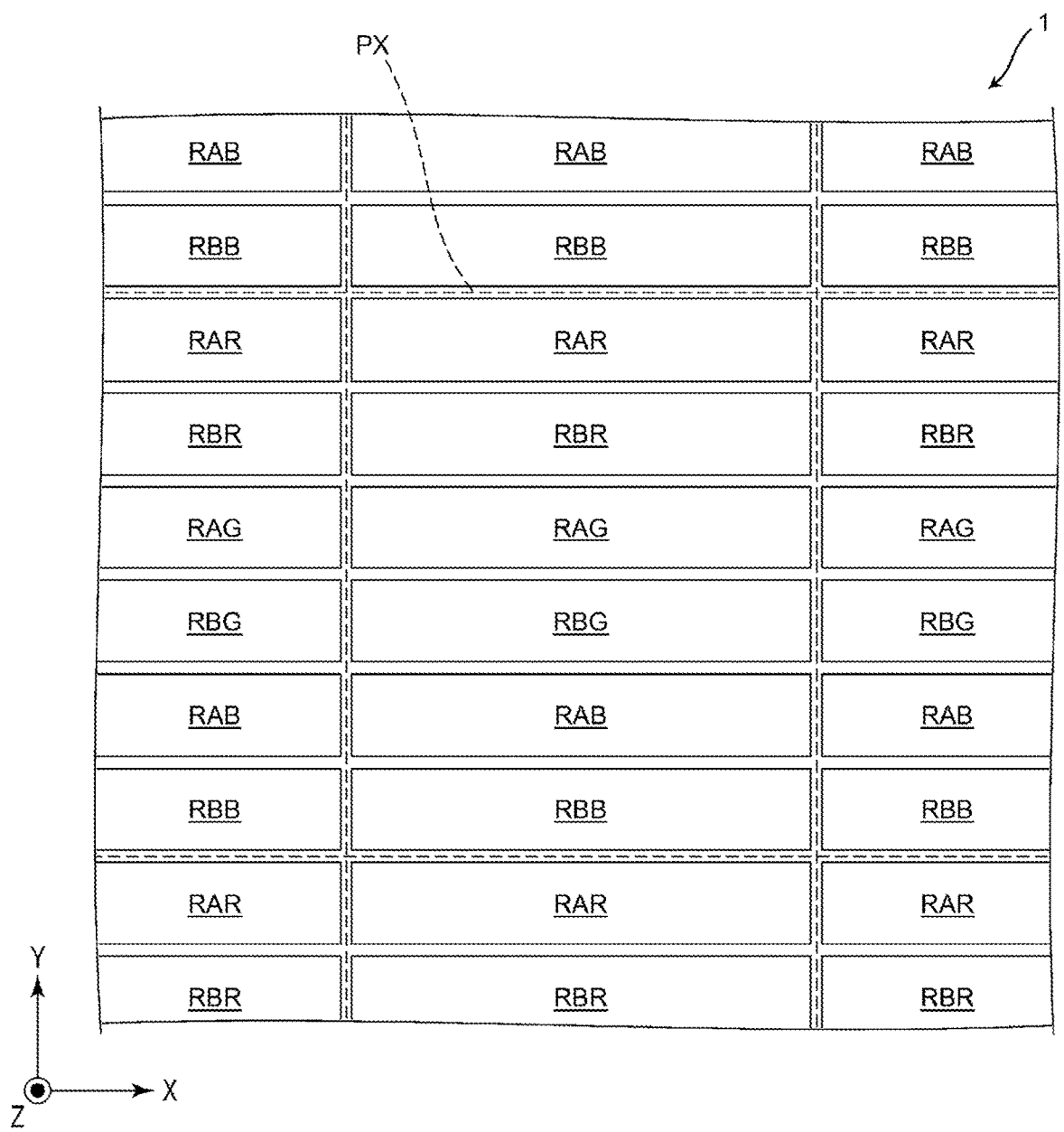
FIG. 27 is a schematic plan view illustrating another example of a structure which can be used for displaying a full color image.

FIG. 27 is a schematic plan view illustrating another example of a structure which can be used for displaying a full color image.

The structure shown in FIG. 27 is the same as the structure described referring to FIG. 25 except for the following points. Specifically, in each pixel PX having a structure shown in FIG. 27, the first and fourth sub-regions RAR and RBR are arrayed in the second direction, the second and fifth sub-regions RAG and RBG are arrayed in the second direction, and the third and sixth sub-regions RAB and RBB are arrayed in the second direction. The column of the first and fourth sub-regions RAR and RBR, the column of the second and fifth sub-regions RAG and RBG, and the column of the third and sixth sub-regions RAB and RBB are arrayed in the second direction.

Specifically, in each pixel PX having the structure shown in FIG. 27, the wide-range display sub-regions RAR, RAG and RAB and the narrow-range display sub-regions RBR, RBG and RBB are arrayed so that the sub-regions displaying the same color are adjacent to each other in the width direction. In each pixel PX, the sub-regions RAR, RBR, RAG, RBG, RAB and RBB are arrayed in this order.

In this structure, the wide-range display sub-regions RAR, RAG and RAB each have a shape extended in the first direction and are arrayed in the second direction, i.e., the width direction thereof. However, the narrow-range display fourth sub-region RBR is interposed between the wide-range display sub-regions RAR and RAG, and the narrow-range display fifth sub-region is interposed between the wide-range display sub-regions RAG and RAB. Therefore, when this structure is used with the sub-regions RAR, RAG and RAB being arranged close to each other in each pixel PX, the diffracted light emerging from these sub-regions is unlikely to mix, unlike in the structure described referring to FIG. 25.

In this structure, the narrow-range display sub-regions RBR, RBG and RBB each have a shape extended in the first direction and are arrayed in the second direction, i.e., the width direction thereof. However, the wide-range display second sub-region RAG is interposed between the narrow-range display sub-regions RBR and RBG, and the wide-range display third sub-region is interposed between the narrow-range display sub-regions RBG and RBB. Therefore, when this structure is used with the sub-regions RBR, RBG and RBB being arranged close to each other in each pixel PX, the diffracted light emerging from these sub-regions is unlikely to mix, unlike in the structure described referring to FIG. 25.

However, as described below, the display 1 using this structure is suitable for displaying images of monochromatic or colorful objects, such as buildings, flowers or animals (e.g., birds or tropical fish), as a diffraction image.

If a distance between regions displaying the same color is long in a pixel PX, the directions of the line segments respectively connecting these regions to the observer's eyes may be greatly deviated. For example, if the regions displaying the same color are greatly separated from each other in the array direction of the crests or troughs PR in a pixel PX, the line segments respectively connecting these regions to the observer's eyes may be greatly deviated. As a result, the diffracted light emerging from these regions toward the observer' eyes may have wavelengths which are greatly offset from each other.

In the structure described referring to FIG. 27, the wide-range display sub-regions RAR, RAG and RAB and the narrow-range display sub-regions RBR, RBG and RBB both have a width direction matching the array direction of the crests or troughs PR. As described above, in each pixel PX, the regions displaying the same color among the wide-range display sub-regions RAR, RAG and RAB and the narrow-range display sub-regions RBR, RBG and RBB are arrayed adjacent to each other in the width direction thereof and thus are close to each other. Therefore, the offset between the wavelengths mentioned above is unlikely to occur. Accordingly, the display 1 using this structure is suitable for displaying images of monochromatic or colorful objects as diffraction images.

Figure 28:
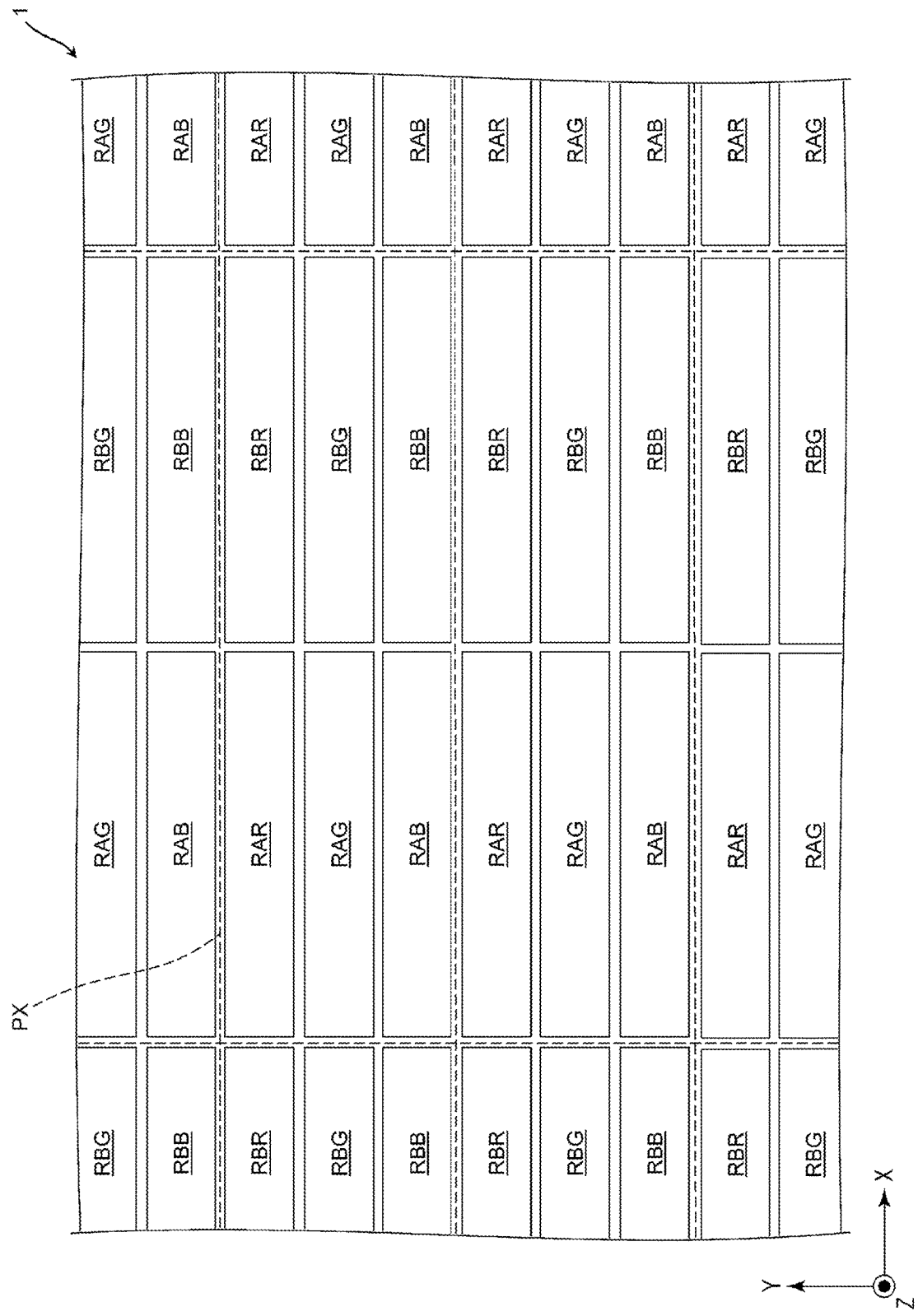
FIG. 28 is a schematic plan view illustrating still another example of a structure which can be used for displaying a full color image.

FIG. 28 is a schematic plan view illustrating still another example of a structure which can be used for displaying a full color image.

The structure shown in FIG. 28 is the same as the structure described referring to FIG. 25 except for the following points. Specifically, in each pixel PX having a structure shown in FIG. 28, the sub-regions RAR, RAG and RAB are arrayed in the second direction and the sub-regions RBR, RBG and RBB are arrayed in the second direction, so that the column of the sub-regions RAR, RAG and RAB and the column of the sub-regions RBR, RBG and RBB are arrayed in the first direction. The first and fourth sub-regions RAR and RBR are adjacent to each other in the first direction, the second and fifth sub-regions RAG and RBG are adjacent to each other in the first direction, and the third and sixth sub-regions RAB and RBB are adjacent to each other in the first direction.

Specifically, in each pixel PX having the structure shown in FIG. 28, the wide-range display sub-regions RAR, RAG and RAB and the narrow-range display sub-regions RBR, RBG and RBB are arrayed so that the sub-regions displaying the same color are adjacent to each other in the length direction thereof, while the sub-regions having different colors are arrayed in the width direction thereof. In each pixel PX herein, the sub-regions RAR, RAG and RAB are arrayed in this order in the Y direction and the sub-regions RBR, RBG and RBB are arrayed in this order in the Y direction, so that the column of the sub-regions RAR, RAG and RAB and the column of the sub-regions RBR, RBG and RBB are adjacent to each other in the X direction.

In this structure, the wide-range display sub-regions RAR, RAG and RAB each have a shape extended in the first direction and are arrayed in the second direction, i.e., the width direction thereof. Therefore, if the sub-regions RAR, RAG and RAB are arranged close to each other in each pixel PX, the diffracted light emerging from these sub-regions is easily mixed.

In this structure, the narrow-range display sub-regions RBR, RBG and RBB each have a shape extended in the first direction and are arrayed in the second direction, i.e., the width direction thereof. Therefore, if the sub-regions RBR, RBG and RBB are arranged close to each other in each pixel PX, the diffracted light emerging from these sub-regions is easily mixed.

In this structure, the wide-range display sub-regions RAR, RAG and RAB and the narrow-range display sub-regions RBR, RBG and RBB both have a width direction matching the array direction of the crests or troughs PR. As described above, in each pixel PX, the regions displaying the same color among the wide-range display sub-regions RAR, RAG and RAB and the narrow-range display sub-regions RBR, RBG and RBB are adjacent to each other in the length direction thereof. Use of such an arrangement can prevent the occurrence of large offset between the wavelengths of the diffracted light reaching the observer's eyes from the regions displaying the same color in each pixel PX.

However, as mentioned above, in each pixel PX of this structure, the regions displaying the same color among the wide-range display sub-regions RAR, RAG and RAB and the narrow-range display sub-regions RBR, RBG and RBB are adjacent to each other in the length direction thereof. Therefore, the direction of the diffracted light emerging from one of the adjacent regions to the right eye is different from the direction of the diffracted light emerging from the other adjacent region to the right eye. Similarly, the direction of the diffracted light emerging from one of the adjacent regions to the left eye is also different from the direction of the diffracted light emerging from the other adjacent region to the left eye. Accordingly, in the case of displaying an image with a large apparent depth as a diffraction image on the display 1 having this structure, the observer may have a high probability of feeling that the image is blurred. Therefore, the display 1 having this structure is suitable, for example, for displaying an image such as of three-dimensional characters, cameos or coins with a small apparent depth as a diffraction image. Images with a small apparent depth may be images of three-dimensional characters, cameos, coins, and the like.

The structures described referring to FIGS. 25 to 28 are used for displaying a full color image as a diffraction image on the display 1. However, similar structures may be used for displaying a monochrome image on the display 1.

Specifically, the structures described referring to FIGS. 25 to 28 may be modified, for example, so that the intensity ratio of diffracted light emerging from the wide-range display sub-regions RAR, RAG and RAB and the intensity ratio of diffracted light emerging from the narrow-range display sub-regions RBR, RBG and RBB are constant in a pixel PX or between pixels PX. Using such structures, a monochrome image or a black-and-white image can be displayed as diffraction images on the display 1.

As described above, the structure described referring to FIG. 25 is suitable for producing a mixed color from the diffracted light emerging from the sub-regions RAR, RAG and RAB and a mixed color from the diffracted light emerging from the sub-regions RBR, RBG and RBB in each pixel PX. Thus, the display 1 obtained by modifying this structure as described above is also suitable for displaying a monochrome image, e.g., a white-and-black image, having high definition and a reasonable chroma level as a diffraction image.

Next, a transfer foil according to an embodiment of the present invention will be described.

Figure 29:
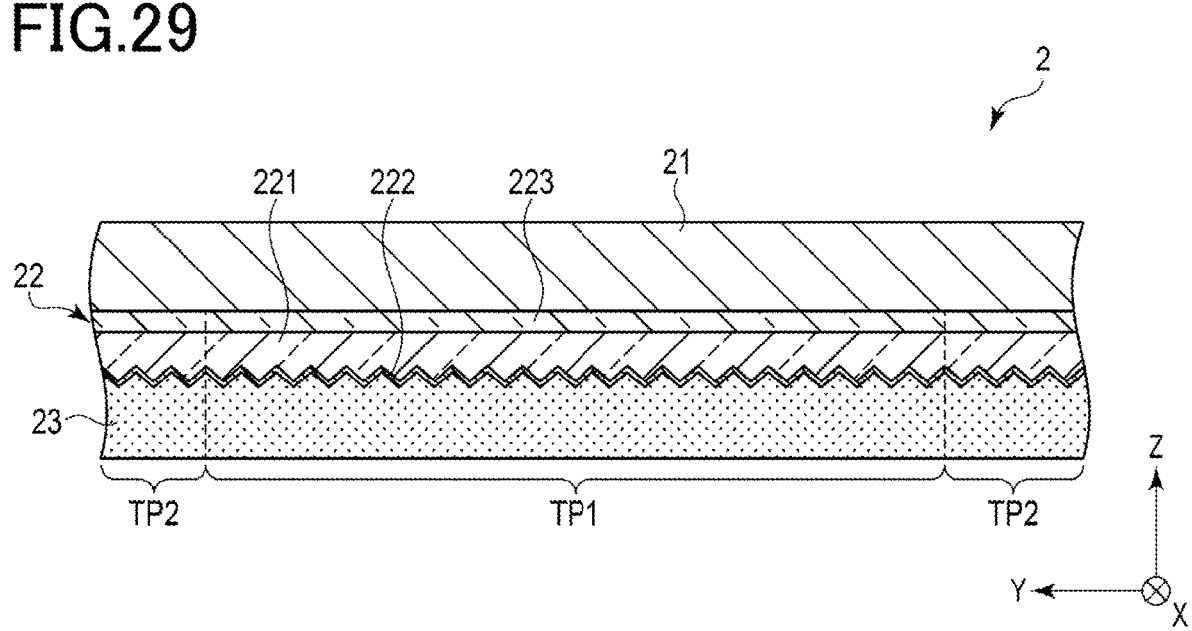
FIG. 29 is a schematic cross-sectional view illustrating a transfer foil according to an embodiment of the present invention.

FIG. 29 is a schematic cross-sectional view illustrating a transfer foil according to an embodiment of the present invention.

FIG. 29 shows a transfer foil 2 including a support 21, a transfer layer 22 and an adhesive layer 23.

The support 21 separably supports the transfer layer 22.
The adhesive layer 23 covers the transfer layer 22.

The transfer layer 22 includes a relief structure forming layer 221, a reflective layer 222 and a separation protective layer 223. The separation protective layer 223, the relief structure forming layer 221 and the reflective layer 222 are laminated on the support 21 in this order.

The transfer layer 22 includes a transfer portion TP1 and a non-transfer portion TP2 which are adjacent to each other.

In the transfer layer 22, the transfer portion TP1 is transferred to an article and includes the display 1 described above. In the transfer layer 22, the non-transfer portion TP2 remains without being transferred to the article.

Next, an adhesive label according to an embodiment of the present invention will be described.

Figure 30:
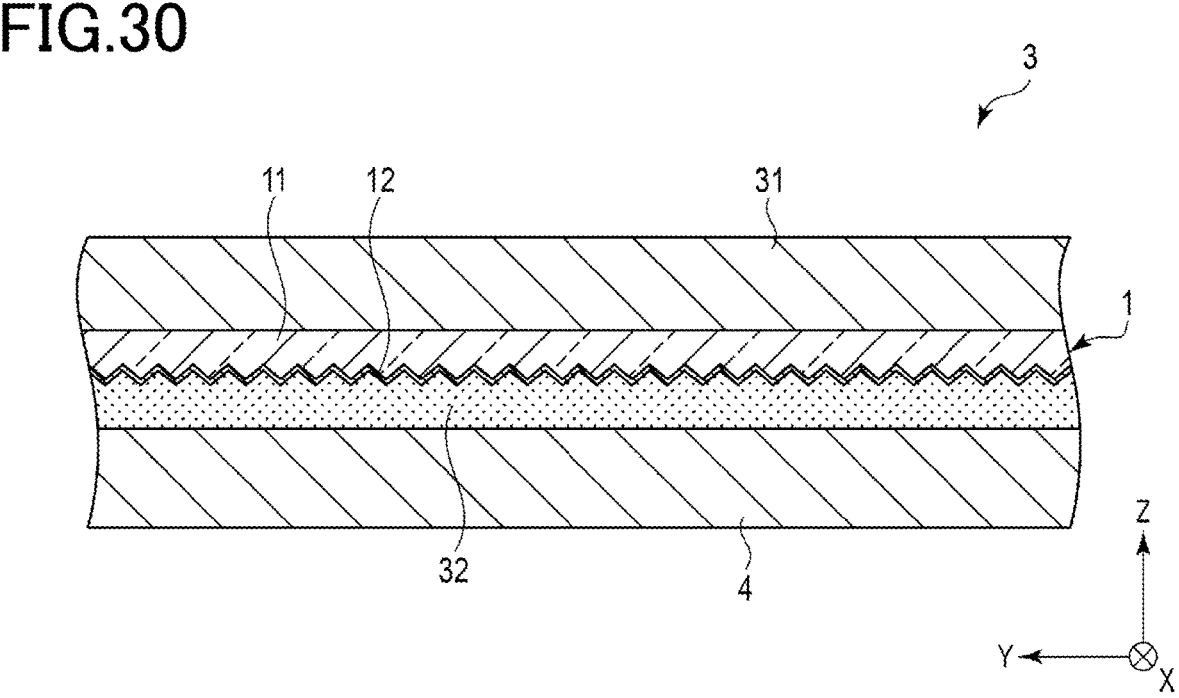
FIG. 30 is a schematic cross-sectional view illustrating an adhesive label according to an embodiment of the present invention.

FIG. 30 is a schematic cross-sectional view illustrating an adhesive label according to an embodiment of the present invention.

FIG. 30 shows an adhesive label 3 including a substrate 31 and an adhesive layer 32. In FIG. 30, the reference sign 4 indicates a mount.

For example, the substrate 31 is a transparent resin film. The substrate 31 has one major surface supporting the display 1.

The adhesive layer 32 is provided to one major surface of the display 1. The adhesive layer 32 faces the substrate 31 via the display 1. The adhesive layer 32 is protected by the mount 4 until immediately before use of the adhesive label 3.

Next, an article having a display according to an embodiment of the present invention will be described.

Figure 31:
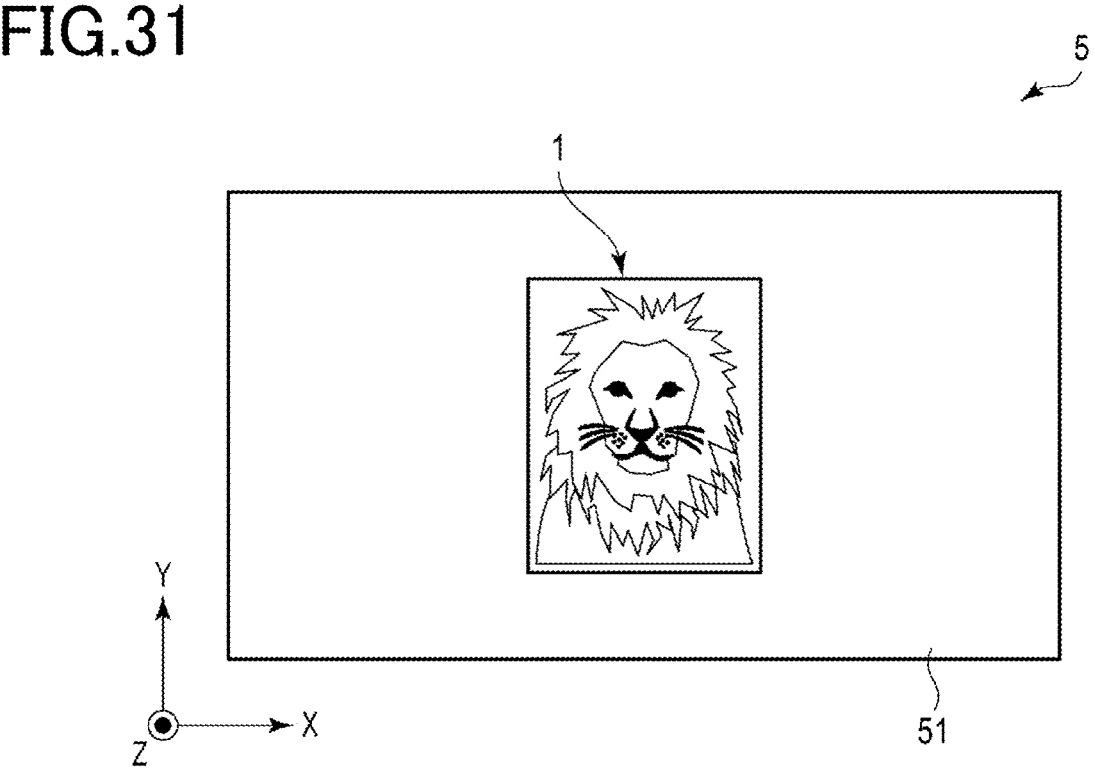
FIG. 31 is a schematic plan view illustrating an article having a display, according to an embodiment of the present invention.

FIG. 31 is a schematic plan view illustrating an article having a display, according to an embodiment of the present invention.

FIG. 31 shows an article 5 having a display, as printed matter. The article 5 having a display may be, for example, gift tickets, securities, bank notes, ID (identification) cards, passports, or the like.

The article 5 having a display includes a display 1 and an article 51 supporting the display 1.

The article 51 includes a printing substrate, such as paper, and a printing layer provided to the printing substrate. The printing substrate may be, for example, a paper substrate, a transparent or translucent resin substrate.

The display 1 is bonded to the surface of the article 51 or embedded in the article 51 so as to be supported by the article 51. As an example, the display 1 is bonded to the article 51 by using an adhesive label or a transfer foil.

If the article 51 is transparent, the display 1 may be embedded in the article 51. Such a structure is obtained, for example, by sandwiching the display 1 between a plurality of transparent resin substrates and laminating the transparent resin substrates.

If the article 51 is translucent as in the case of using a paper substrate or a translucent resin substrate as a printing substrate, the above structure can be obtained, for example, through the following method. First, a display 1 is sandwiched between a plurality of paper substrates or translucent resin substrates and integrated with each other. Next, a window is provided to one or more of the substrates at a position corresponding to the display 1 so that the display 1 is visible.

The printing layer of the article 51 may display a printed image which is formed by using the original of the image presented by the display 1. In this case, since the printed image and the image on the display 1 correspond to each other, if either one of these images is fraudulently changed or rewritten, the fraudulent activity can be detected. As an example, the same image of an animal, a person or the like may be used as an original of the printed image and the image on the display 1.

Next, an article having a display according to another embodiment of the present invention will be described.

Figure 32:
FIG. 32 is a schematic plan view illustrating an article having a display, according to another embodiment of the present invention.

FIG. 32 is a schematic plan view illustrating an article having a display, according to another embodiment of the present invention.

FIG. 32 shows an article 51 having an elongated shape in the X direction herein.

The article 51 includes a printing substrate 52, such as paper, and a printing layer 53 provided to the printing substrate 52. The printing layer 53 configures a print pattern displaying a plurality of characters. The width direction of the characters herein is parallel to the X direction.

The display 1 is bonded to the surface of the article 51 or embedded in the article 51 so as to be supported by the article 51. The center of the display 1 herein is distanced from the plane passing through the center of the article 51 and perpendicular to the X direction.

The display 1 is similar to the display according to the first or second embodiment except for using the following configuration.

Figure 33:
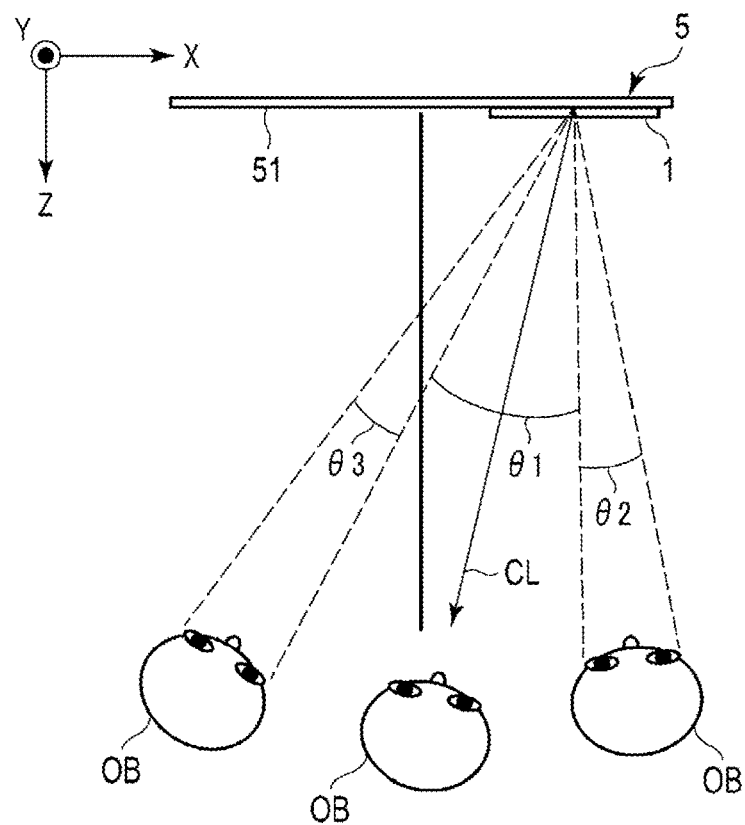
FIG. 33 is a schematic diagram illustrating a scene in which the display shown in FIG. 32 is observed by observers.

FIG. 33 is a schematic diagram illustrating a scene in which the article having a display shown in FIG. 32 is observed by observers.

As shown in FIG. 33, in the display 1 included in the article 5 having a display shown in FIG. 32, a line segment LC extending from the center of the display 1 and equally dividing the angular range of diffracted light emerging from the first subpixels is tilted with respect to the plane passing through the center of the article 51 and perpendicular to the X direction. This configuration can be achieved by adopting the following structure to the subpixels.

Figure 34:
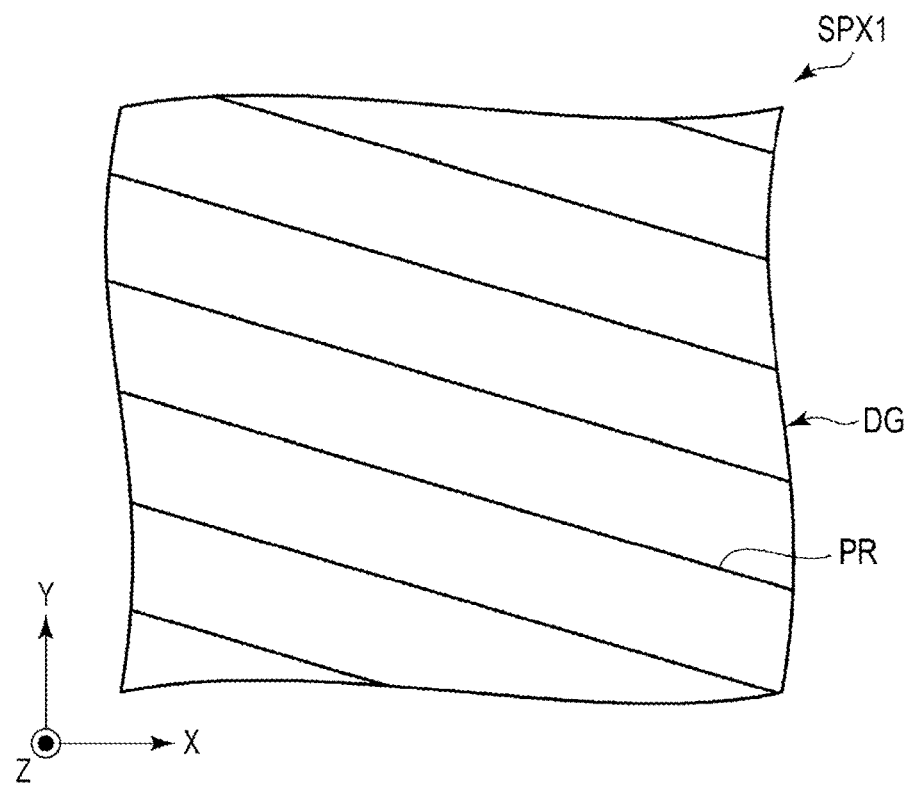
FIG. 34 is an enlarged schematic plan view illustrating an example of a structure which can be used for first subpixels or the like in the display included in the article having a display shown in FIG. 32.
Figure 35:
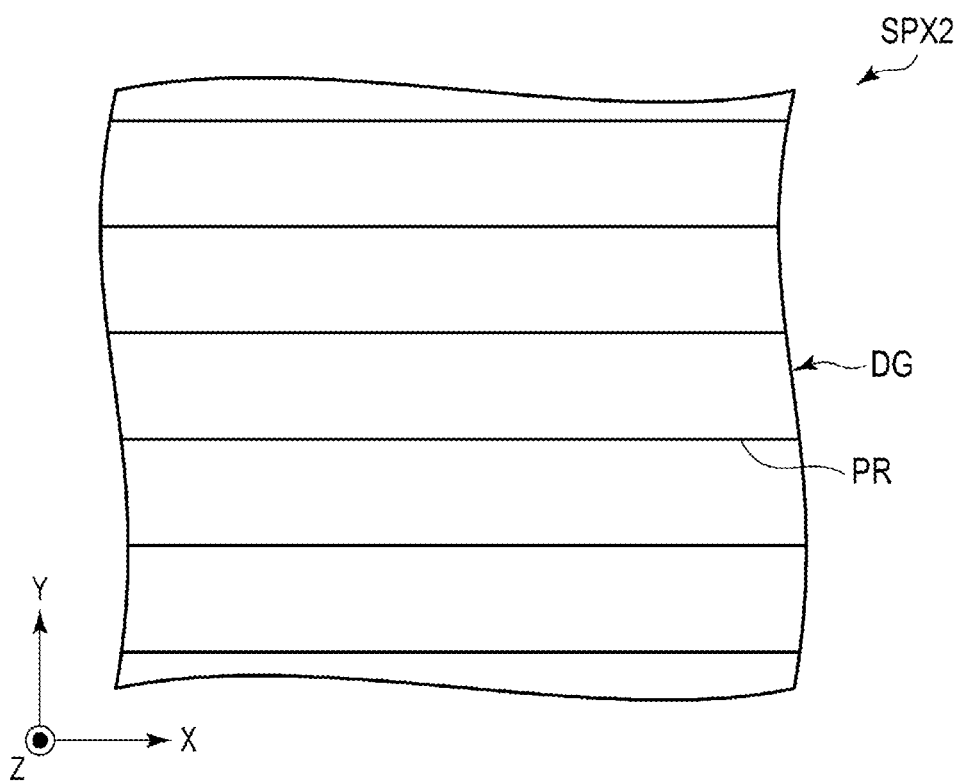
FIG. 35 is an enlarged schematic plan view illustrating an example of a structure which can be used for second subpixels in the display included in the article having a display shown in FIG. 32.
Figure 36:
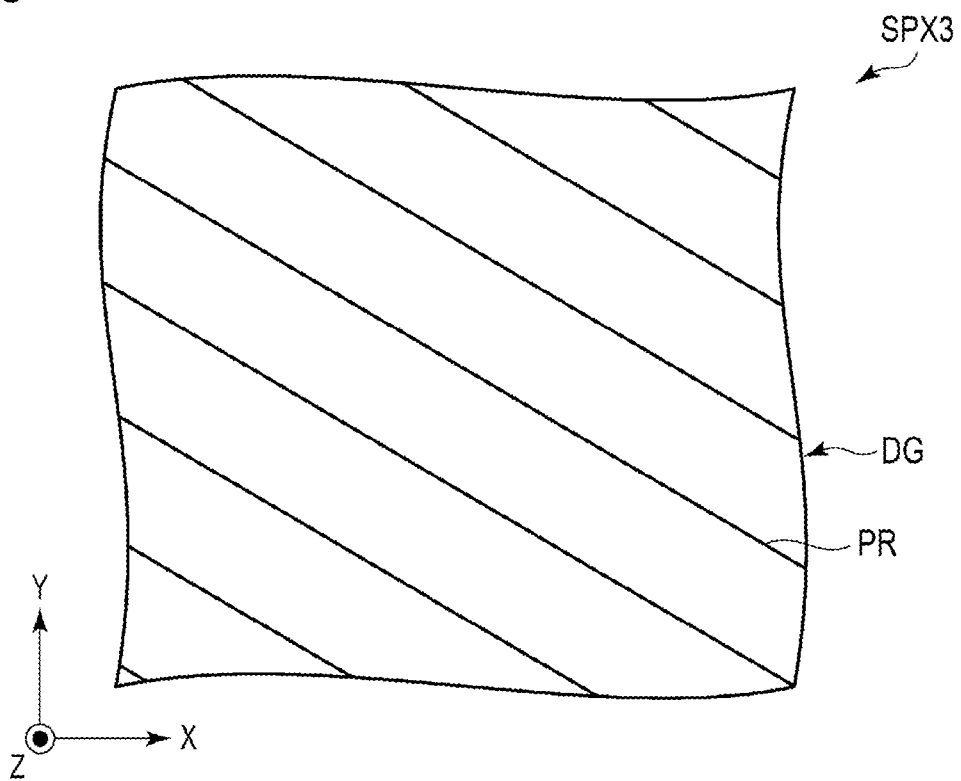
FIG. 36 is an enlarged schematic plan view illustrating an example of a structure which can be used for third subpixels in the display included in the article having a display shown in FIG. 32.

FIG. 34 is an enlarged schematic plan view illustrating an example of a structure which can be used for first subpixels or the like in the display included in the article having a display shown in FIG. 32. FIG. 35 is an enlarged schematic plan view illustrating an example of a structure which can be used for second subpixels in the display included in the article having a display shown in FIG. 32. FIG. 36 is an enlarged schematic plan view illustrating an example of a structure which can be used for third subpixels in the display included in the article having a display shown in FIG. 32.

Of the first sub pixels SPX1, the subpixels SPX1*a* and SPX1*b* in the display 1 included in the article 5 having a display shown in FIG. 32, those which emit first diffracted light have crests or troughs PR in the diffraction grating DG, whose length directions relative to the X direction are in the range of $\beta_1$ to $\beta_2$ ($\beta_1 < \beta_2$, $0° < \beta_1 + \beta_2$). Of the second subpixels SPX2, those which emit second diffracted light have crests or troughs PR in the diffraction grating DG, whose length directions relative to the X direction are in the range of $\beta_0$ to $\beta_1$ ($\beta_0 < \beta_1$). Of the third subpixels SPX3, those which emit third diffracted light have crests or troughs PR in the diffraction grating DG, whose length directions relative to the X direction are in the range of $\beta_2$ to $\beta_3$ ($\beta_2 \beta_3$).

The article 51 shown in FIG. 32 is designed to correctly display an image when the article is observed such that the line segment connecting between the observer's eyes is parallel to the X direction. If the article 51 is designed in this way, observers usually observe the article 5 having a display, such that the center of the article is located in the plane passing through the intermediate point between the observer's eyes and perpendicular to the line segment connecting between the observer's eyes.

However, in the article 5 having a display, the center of the display 1 is distanced from the plane passing through the center of the article 51 and perpendicular to the X direction. Thus, when the article 5 having a display is observed in the above positional relationship, the center of the display 1 is distanced from the plane passing through the intermediate point between the observer's eyes and perpendicular to the line segment connecting between the observer's eyes. Therefore, in the case of using the configuration described in the first or second embodiment, or specifically, in the case of using a configuration in which the line segment extending from the center of the display 1 and equally dividing the angular range of the diffracted light emerging from the first subpixels is parallel to the Z direction, an additional action is required to be performed, e.g., moving the article 5 having a display such that the center of the display 1 is located in the plane passing through the intermediate point between the observer's eyes and perpendicular to the line segment connecting between the observer's eyes, in order to observe a continuously changing image presented by the display 1.

In this regard, as shown in FIG. 33, in the article 5 having a display described referring to FIGS. 32 to 36, the line segment CL equally dividing the angular range of the diffracted light emerging from the first subpixels is tilted as mentioned above. Therefore, the observer OB, for example, can observe the brightest image the display 1 can display under the normal observation conditions for observing the article 51. Accordingly, the article 5 having a display using the above configuration easily enables the observer to observe the image presented by the display 1.

What is claimed is:

1. A display, comprising:
 a plurality of pixels each including a wide-range display region and a narrow-range display region, wherein:
 in each of the plurality of pixels,
  the wide-range display region includes no diffraction grating, or includes a wide-range display diffraction grating formed of first crests or troughs curved in an arc shape and arrayed in a width direction,
  the narrow-range display region includes no diffraction grating, or includes a narrow-range display diffraction grating formed of second crests or troughs curved in an arc shape and arrayed in a width direction, and
  the arc formed by the first crests or troughs is a first arc or a part thereof having a first center angle, and the arc formed by the second crests or troughs is a second arc or a part thereof having a second center angle smaller than the first center angle; and
 the plurality of pixels are configured to display a continuously changing image with diffracted light emerging from the wide-range display diffraction grating and diffracted light emerging from the narrow-range display diffraction grating.

2. A display, comprising:
 a plurality of pixels each including a wide-range display region and a narrow-range display region, wherein
 in each of the plurality of pixels,
  the wide-range display region includes no diffraction grating, or includes a wide-range display diffraction grating formed of first crests or troughs curved in an arc shape and arrayed in a width direction,
  the narrow-range display region includes no diffraction grating, or includes a narrow-range display diffraction grating formed of second crests or troughs curved in an arc shape and arrayed in a width direction, the wide-range display region and the narrow-range display region have an equal dimension in a direction perpendicular to the width direction, and a curvature of the arc formed by the second crests or troughs is smaller than a curvature of the arc formed by the first crests or troughs; and the plurality of pixels are configured to display a continuously changing image with diffracted light emerging from the wide-range display diffraction grating and diffracted light emerging from the narrow-range display diffraction grating.

3. The display of claim 1, wherein the wide-range display region and the narrow-range display region each include a plurality of subpixels arrayed in a direction perpendicular to the width direction.

4. The display of claim 1, wherein the display is configured to display a full color image as the continuously changing image.

5. The display of claim 1, wherein each of the plurality of pixels includes first to third sub-regions as the wide-range display region, and fourth to sixth sub-regions as the narrow-range display region, the first and fourth sub-regions displaying a first color, the second and fifth sub-regions displaying a second color different from the first color, the third and sixth sub-regions displaying a third color different from the first and second colors.

6. The display of claim 5, wherein
in each of the plurality of pixels,
the first to sixth sub-regions each have a shape extended in a first direction intersecting an array direction of the first crests or troughs and an array direction of the second crests or troughs;
the first to third sub-regions are arrayed in a second direction intersecting the first direction;
the fourth to sixth sub-regions are arrayed in the second direction;
a column formed by the first to third sub-regions and a column formed by the fourth to sixth sub-regions are arrayed in the second direction;
two of the second, third, fifth and sixth sub-regions are interposed between the first and fourth sub-regions;
two of the first, third, fourth and sixth sub-regions are interposed between the second and fifth sub-regions; and
two of the first, second, fourth and fifth sub-regions are interposed between the third and sixth sub-regions.

7. The display of claim 5, wherein
in each of the plurality of pixels,
the first to sixth sub-regions each have a shape extended in a first direction intersecting an array direction of the first crests or troughs and an array direction of the second crests or troughs;
the first and fourth sub-regions are arrayed in a second direction intersecting the first direction;
the second and fifth sub-regions are arrayed in the second direction;
the third and sixth sub-regions are arrayed in the second direction; and
a column formed by the first and fourth sub-regions, a column formed by the second and fifth sub-regions, and a column formed by the third and sixth sub-regions are arrayed in the second direction.

8. The display of claim 5, wherein
in each of the plurality of pixels,
the first to sixth sub-regions each have a shape extended in a first direction intersecting an array direction of the first crests or troughs and an array direction of the second crests or troughs;
the first to third sub-regions are arrayed in a second direction intersecting the first direction;
the fourth to sixth sub-regions are arrayed in the second direction;
a column formed by the first to third sub-regions and a column formed by the fourth to sixth sub-regions are arrayed in the first direction;
the first and fourth sub-regions are adjacent to each other in the first direction;
the second and fifth sub-regions are adjacent to each other in the first direction; and
the third and sixth sub-regions are adjacent to each other in the first direction.

9. The display of claim 1, comprising:
a relief structure forming layer having a relief structure on a surface thereof; and
a reflective layer covering the surface, wherein
the relief structure is provided with the wide-range display diffraction grating and the narrow-range display diffraction grating at an interface between the relief structure forming layer and the reflective layer, or on a surface of the reflective layer.

10. The display of claim 9, wherein the reflective layer has visible light transmissivity.

11. A transfer foil comprising a transfer layer including the display of claim 1, and a support separably supporting the transfer layer.

12. An adhesive label comprising the display of claim 1, and an adhesive layer provided to one major surface of the display.

13. An article having a display, comprising the display of claim 1, and an article supporting the display.

14. The article having a display of claim 13, wherein the article has an elongated shape, the display has a center which is distanced from a plane passing through a center of the article and perpendicular to a length direction of the article, and a line segment extending from the center of the display and equally dividing an angular range of diffracted light emerging from the wide-range display diffraction grating is tilted with respect to the plane.

15. The article having a display of claim 13, wherein the article includes a print pattern, the print pattern presents characters, the display has a center which is distanced from a plane passing through a center of the article and perpendicular to a width direction of the characters, and a line segment extending from the center of the display and equally dividing an angular range of diffracted light emerging from the wide-range display diffraction grating is tilted with respect to the plane.

* * * * *